US012456095B2

(12) United States Patent
Ishii et al.

(10) Patent No.: US 12,456,095 B2
(45) Date of Patent: Oct. 28, 2025

(54) INFORMATION MANAGEMENT SYSTEM

(71) Applicant: TOYOTA JIDOSHA KABUSHIKI KAISHA, Toyota (JP)

(72) Inventors: Masahiko Ishii, Okazaki (JP); Hidetaka Asano, Nisshin (JP); Takuya Kondo, Toyota (JP); Ryota Suzuki, Ikeda (JP); Keiichi Koga, Narashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 17/752,456

(22) Filed: May 24, 2022

(65) Prior Publication Data
US 2022/0383245 A1 Dec. 1, 2022

(30) Foreign Application Priority Data

May 28, 2021 (JP) ................................ 2021-090491

(51) Int. Cl.
*G06Q 10/087* (2023.01)
(52) U.S. Cl.
CPC ................. *G06Q 10/087* (2013.01)
(58) Field of Classification Search
CPC ...... G06Q 10/087; G06Q 10/08; G06Q 10/06; G06Q 50/04; G06Q 50/06; G06Q 10/103;
(Continued)

(56) References Cited

U.S. PATENT DOCUMENTS

2003/0088424 A1* 5/2003 Gottselig ............... G06Q 10/30
705/28
2007/0271299 A1* 11/2007 Wang ..................... G06Q 50/02
(Continued)

FOREIGN PATENT DOCUMENTS

| JP | 2008-102899 A | 5/2008 |
| JP | 2009-070257 A | 4/2009 |
| JP | 2011-145720 A | 7/2011 |

OTHER PUBLICATIONS

Takhar, Sukhraj S. et al; "Blockchain application in supply chain chemical substance reporting"; 22nd Cambridge International Manufacturing Symposium; University of Cambridge, Sep. 27-28, 2018, [Online] Sep. 27, 2018, pp. 1-21.
(Continued)

*Primary Examiner* — Florian M Zeender
*Assistant Examiner* — Vanessa Deligi
(74) *Attorney, Agent, or Firm* — Oliff PLC

(57) ABSTRACT

A node of a C company verifies transaction data received from a node of a B company, the transaction data proposing addition of a subject substance to a restriction list. When the node of the C company determines that information indicating that a new proposed subject substance falls under a restricted substance is incorrect by obtaining data on the restricted substance, for example, from the outside (a server apparatus or the like in an external group) and checking whether or not the subject substance falls under the restricted substance, the node of the C company does not approve the proposal for addition of the new subject substance to the restriction list but transmits transaction data that denies the proposal to the node of the B company (an arrow B5).

2 Claims, 18 Drawing Sheets

(58) Field of Classification Search
CPC .. G06Q 10/06395; G06Q 50/08; G06Q 50/02; G06Q 50/26; B22F 10/80; B22F 10/85; B29C 64/386
See application file for complete search history.

(56) References Cited

U.S. PATENT DOCUMENTS

| | | | |
|---|---|---|---|
| 2008/0126425 A1* | 5/2008 | Cardin | G06Q 10/087 |
| 2008/0154749 A1* | 6/2008 | D'hooghe | G06Q 50/26 |
| | | | 705/28 |
| 2011/0251799 A1* | 10/2011 | Tanaka | G06Q 10/06 |
| | | | 702/23 |
| 2016/0132896 A1* | 5/2016 | Guerin | G06Q 30/018 |
| | | | 705/317 |
| 2018/0276679 A1* | 9/2018 | Fang | G06Q 10/08 |
| 2019/0318327 A1* | 10/2019 | Sowell | H04L 67/1093 |
| 2020/0052883 A1* | 2/2020 | Dender | H04L 63/126 |
| 2020/0118117 A1* | 4/2020 | McManus | G06Q 20/06 |
| 2020/0143277 A1* | 5/2020 | Levine | G06Q 10/08 |
| 2021/0158372 A1 | 5/2021 | Dittmann et al. | |
| 2021/0192620 A1* | 6/2021 | Golomb | G06Q 30/0204 |

OTHER PUBLICATIONS

"Supply chain adaptation of the block chains to be seen. Business On Toyota G. Practical Application of the company DX and block chain chains" [online], Oct. 19, 2020, https://www.neweconomy.jp/features/d xbc/70269.

Translation of May 28, 2024 Office Action issued in Japanese Patent Application No. 2021-090491.

* cited by examiner

FIG.7 RESPONSE TO UPDATE OF RESTRICTION LIST

INFORMATION MANAGEMENT SYSTEM

This nonprovisional application is based on Japanese Patent Application No. 2021-090491 filed with the Japan Patent Office on May 28, 2021, the entire contents of which are hereby incorporated by reference.

BACKGROUND

Field

The present disclosure relates to an information management system.

Description of the Background Art

Japanese Patent Laying-Open No. 2009-70257 discloses an information management system that manages information on a chemical substance contained in a component traded in a supply chain including an end product manufacturer and a supplier that supplies components to the end product manufacturer. This information management system is connected to a supplier terminal used by the supplier and another supplier terminal used by another supplier over a network. Another supplier supplies the supplier with a sub-component included in a component delivered by the supplier to the end product manufacturer. The supplier requests another supplier to disclose information on a chemical substance contained in the sub-component for giving information on the chemical substance contained in the component to the end product manufacturer.

SUMMARY

A chemical substance managed in the information management system disclosed in Japanese Patent Laying-Open No. 2009-70257 may be designated, for example, by a terminal of any company (for example, an end product manufacturer) that participates in the information management system. Input contents, however, may be incorrect; for example, a chemical substance not restricted under laws and regulations etc. may be designated as a restricted chemical substance, or a chemical substance restricted under the laws and regulations etc. may be designated as a chemical substance that is not restricted. When information is managed based on incorrect contents, the chemical substance may not appropriately be managed in the information management system, or the supplier or the like may be requested to disclose information more than necessary.

The present disclosure was made to solve the problem above, and an object of the present disclosure is to appropriately set information on a chemical substance to be managed in an information management system that manages information on a chemical substance contained in a product distributed in a supply chain.

(1) An information management system according to one aspect of the present disclosure is an information management system that manages information on a chemical substance contained in a product distributed in a supply chain. This information management system includes a plurality of apparatuses belonging to a plurality of companies included in the supply chain, respectively, and a network over which the plurality of apparatuses are connected to one another. Each of the plurality of apparatuses includes a list that shows a chemical substance managed in the information management system and discloses to an apparatus of a downstream company in the supply chain, information on a chemical substance contained in a product supplied to the downstream company and included in the list, the apparatus being included in the plurality of apparatuses. Each of the plurality of apparatuses is configured to perform first processing for providing to another apparatus included in the plurality of apparatuses, a request for addition of a new chemical substance to the list and second processing including processing for denying the request for addition received from another apparatus included in the plurality of apparatuses.

According to the configuration, each of the plurality of apparatuses can deny a request received from another apparatus for addition of a new chemical substance to the list. For example, when contents of a request from another apparatus are incorrect, each of the plurality of apparatuses denies the request for addition. An apparatus that has received the request for addition from another apparatus double-checks the request for addition, and when contents of the request are incorrect, the apparatus denies the request, so that information on the chemical substance to be managed can appropriately be set.

(2) In one embodiment, the request for addition includes information showing whether or not the new chemical substance falls under a restricted substance. The restricted substance refers to a chemical substance designated under laws and regulations. When each of the plurality of apparatuses receives the request for addition from another apparatus included in the plurality of apparatuses, each of the plurality of apparatuses verifies the request for addition based on information obtained from an external apparatus that manages information on the laws and regulations. When the information showing whether or not the new chemical substance falls under the restricted substance is incorrect, each of the plurality of apparatuses denies the request for addition.

Information showing whether or not a chemical substance falls under a restricted substance may incorrectly be set. Whether or not a new chemical substance falls under a restricted substance is important information. It may (legally) be obligatory to make a report on a restricted substance, whereas it is not obligatory to make a report on a chemical substance that does not fall under the restricted substance. For example, when a chemical substance that falls under the restricted substance is set as a "non-restricted substance," a report may be omitted. Alternatively, when a chemical substance that does not fall under the restricted substance is set as the "restricted substance," an upstream company or the like may be requested to disclose information more than necessary. According to the configuration, the request for addition is verified based on information obtained from an external apparatus that manages information on the laws and regulations. When the information showing whether or not a chemical substance falls under the restricted substance is incorrect, the request for addition is denied. Therefore, information showing whether or not a new chemical substance falls under the restricted substance can appropriately be set.

(3) In one embodiment, the information management system manages the information on the chemical substance contained in the product distributed in the supply chain with a distributed ledger technology.

According to the configuration, information on the chemical substance contained in the product is managed based on the distributed ledger technology, so that information is quickly conveyed among apparatuses of companies. Therefore, information on the chemical substance contained in the product distributed in the supply chain can be conveyed more quickly, for example, than in management by using such means for communication as an electronic mail, telephone, or facsimile.

Furthermore, tamper resistance of information can be improved by using the distributed ledger technology.

(4) In one embodiment, the plurality of apparatuses include a first apparatus of a first company that manufactures a first product, a second apparatus of a second company that supplies to the first company, a second product included in the first product, and a third apparatus of a third company that supplies to the second company, a third product included in the second product. The first apparatus, the second apparatus, and the third apparatus include a first distributed ledger, a second distributed ledger, and a third distributed ledger, respectively. The first distributed ledger and the second distributed ledger share transaction data including information on a chemical substance contained in the second product. The second distributed ledger and the third distributed ledger share transaction data including information on a chemical substance contained in the third product. The first distributed ledger and the third distributed ledger do not share transaction data.

For example, from a point of view of the second company, the second company may not want the first company to grasp information as to from which company the second company purchases the third product included in the second product. According to the configuration, the first distributed ledger and the third distributed ledger do not share transaction data. Transaction data includes information on a sender or the like. A range within which transaction data is shared is limited to a range between companies in direct business relation and the transaction data is not shared between companies not in direct business relation. Thus, information about the third company can be kept secret to the first company.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
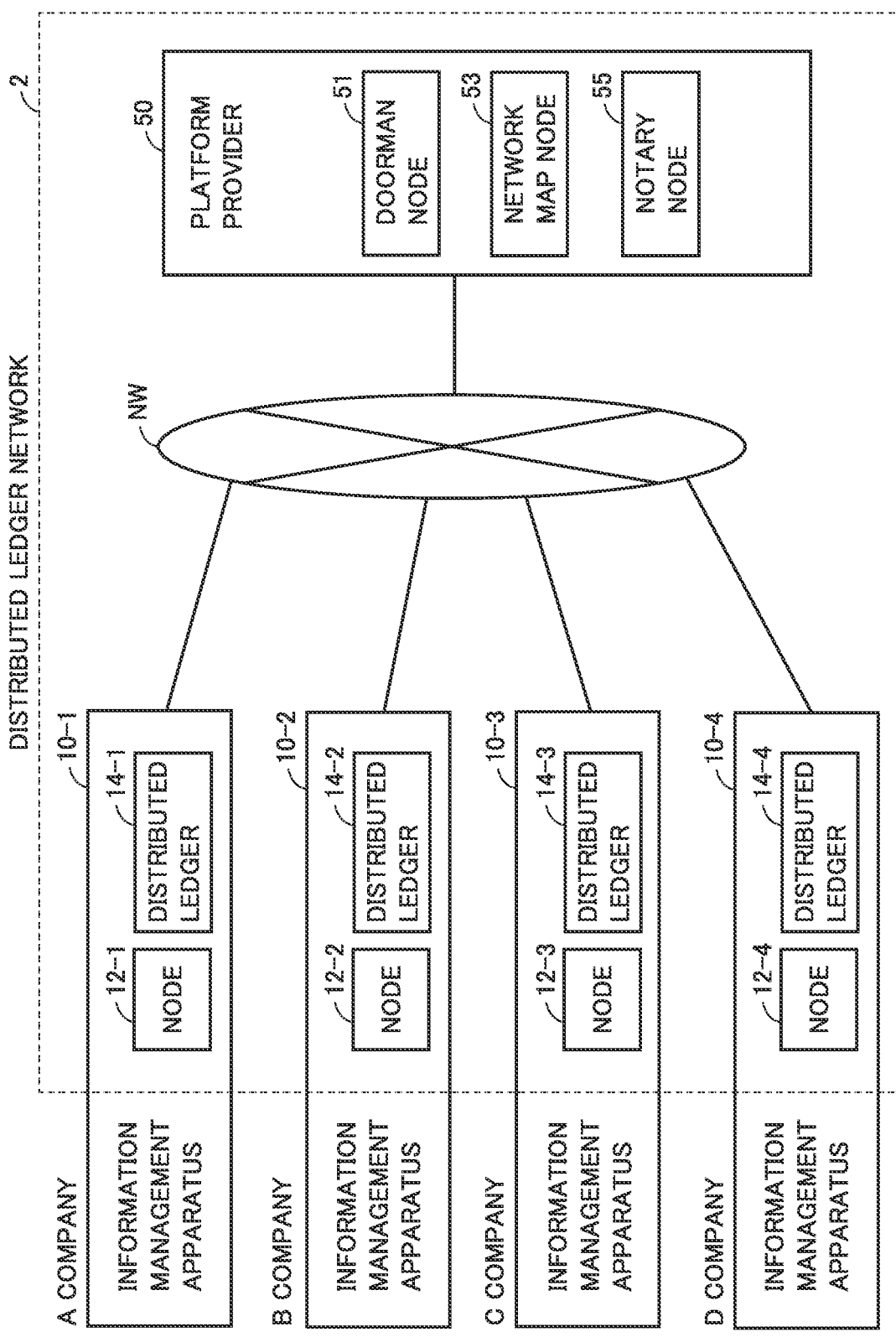
FIG. 1 is a diagram showing a schematic configuration of an information management system according to an embodiment.

An embodiment of the present disclosure will be described in detail below with reference to the drawings. The same or corresponding elements in the drawings have the same reference characters allotted and description thereof will not be repeated.

<Overall Configuration of Information Management System>

FIG. 1 is a diagram showing a schematic configuration of an information management system 1 according to the present embodiment. Information management system 1 according to the present embodiment is a system that manages, based on a distributed ledger technology, information on a specific chemical substance (which is also referred to as a "subject substance" below) contained in a product (including a component, a raw material, and the like) distributed in a supply chain including a plurality of companies. In the present embodiment, by way of example, a supply chain including four companies (for example, an A company, a B company, a C company, and a D company) is assumed. In information management system 1, the subject substance is a chemical substance to be reported to a downstream company in the supply chain. The subject substance includes, for example, a chemical substance designated as a substance of very high concern (SVHC) as a highly harmful substance under the REACH regulation and/or a chemical substance designated in a global automotive declarable substance list (GADSL) which is a chemical substance list managed worldwide. The chemical substance designated as the SVHC and/or the chemical substance designated in the GADSL are/is also referred to as a "restricted substance" below. The restricted substance may include a chemical substance and the like designated under other laws and regulations. Furthermore, a company that participates in information management system 1 can also have an arbitrary chemical substance included as a subject substance. In other words, the subject substance managed in information management system 1 may include a restricted substance and a chemical substance arbitrarily designated by a participating company. Examples of arbitrary chemical substances included in the subject substance include a chemical substance expected to be restricted in the future.

Information management system 1 includes an information management apparatus 10-1 belonging to the A company, an information management apparatus 10-2 belonging to the B company, an information management apparatus 10-3 belonging to the C company, an information management apparatus 10-4 belonging to the D company, and a platform provider 50. In the present embodiment, the A company is an end product manufacturer and falls under what is called a "downstream company" in the supply chain. In the present embodiment, the B company is a component manufacturer and falls under what is called a "midstream company" in the supply chain. In the present embodiment, the C company and the D company are material manufacturers and fall under what is called "upstream companies" in the supply chain.

Figure 2:
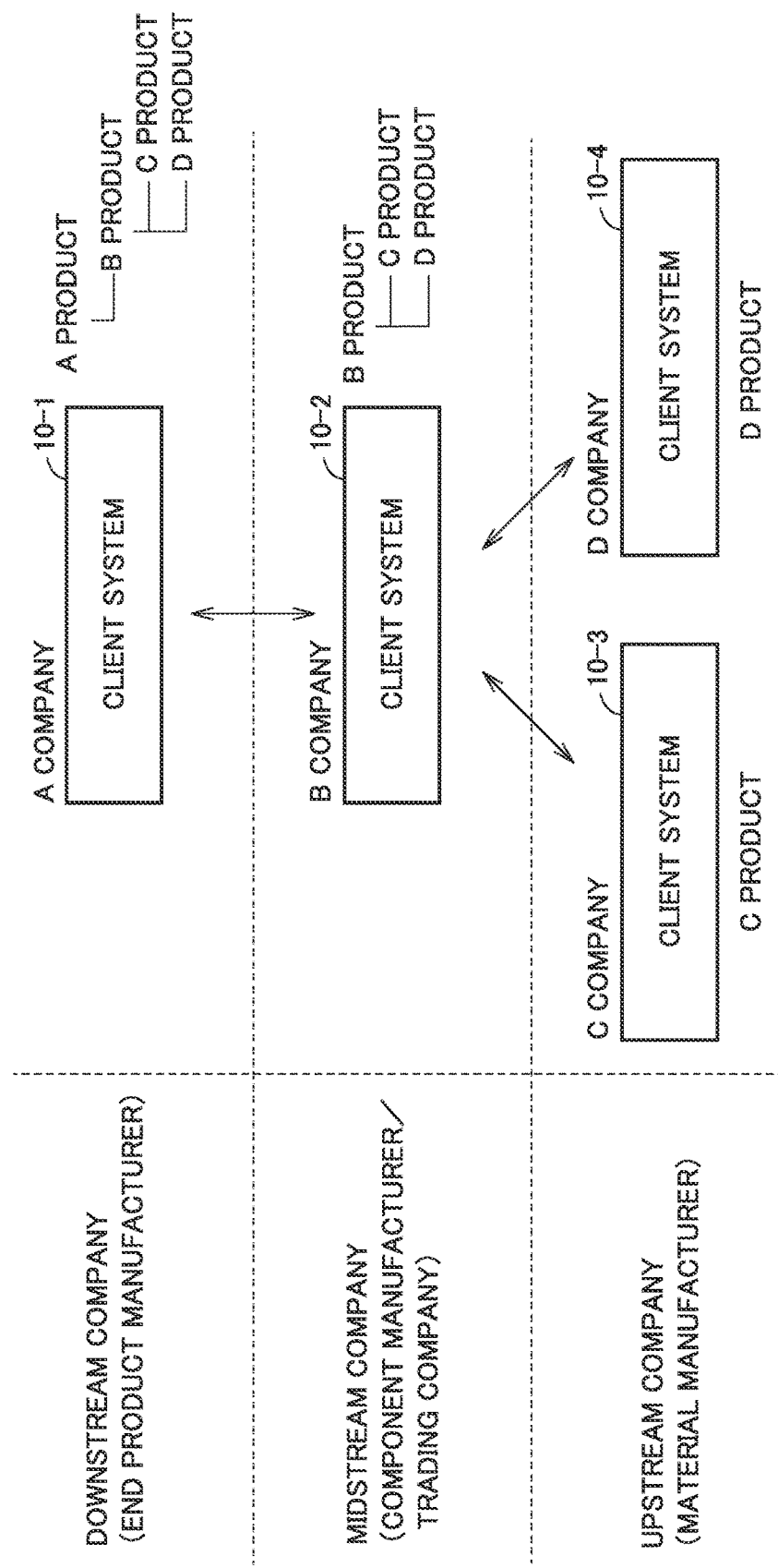
FIG. 2 is a diagram for illustrating business relation among companies in a supply chain.

FIG. 2 is a diagram for illustrating business relation among companies in the supply chain. The C company supplies a C product which is its product to the B company. The D company supplies a D product which is its product to the B company. The B company manufactures a B product which is its product from the C product purchased (supplied) from the C company and the D product purchased from the D company, and supplies the B product to the A company. The A company manufactures an A product which is its product from the product purchased from the B company and sells the A product to an end user. The A company may be, for example, an automaker.

The midstream company may include a trading company. A trading company may be interposed, for example, between the A company and the B company, between the B company and the C company, and/or between the B company and the D company.

Each company is required to manage information on a subject substance contained in a product sold by that company itself. Information on the subject substance contained in a purchased product is disclosed to each company by an upstream company in the supply chain, and each company manages information on the subject substance contained in a product sold thereby. For example, the A company receives from the B company, information on the subject substance contained in the B product, and based on that information, the A company manages the information on the subject substance contained in the A product.

In information management system 1 according to the present embodiment, information is conveyed only between companies in direct business relation. For example, a downstream company (the A company) and a midstream company (the B company) in supply-demand relation of products are in direct business relation. A midstream company (the B company) and an upstream company (the C company and the D company) in supply-demand relation of products are in direct business relation. On the other hand, a downstream company (the A company) and an upstream company (the C company and the D company) are not in direct business relation. In other words, information is conveyed between the downstream company (the A company) and the midstream company (the B company) and between the midstream company (the B company) and the upstream company (the C company and the D company), whereas information is not conveyed between the downstream company (the A company) and the upstream company (the C company and the D company). For example, when an E company which is a trading company is interposed between the A company and the B company, information is conveyed between the A company and the E company and between the E company and the B company, whereas information is not conveyed between the A company and the B company.

For example, when trade of the C product is started between the B company and the C company, information on the subject substance contained in the C product is provided from the C company to the B company. Though detailed description will be given later, the C company may voluntarily provide information on the subject substance contained in the C product to the B company, or the C company may provide that information to the B company in response to a request from the B company. This is also applicable to information provided between the A company and the B company and between the B company and the D company. When trade of the D product is started between the B company and the D company, the D company provides information on the subject substance contained in the D product to the B company. When trade of the B product is started between the A company and the B company, the B company provides information on the subject substance contained in the B product to the A company. Each company thus receives information on the subject substance contained in a purchased product from an upstream company in direct business relation and manages information on the subject substance contained in its product including the purchased product. Information is conveyed between companies over a distributed ledger network 2 (FIG. 1) including information management apparatuses 10-1 to 10-4.

Referring again to FIG. 1, distributed ledger platform software has been installed in each of information management apparatuses 10-1 to 10-4. The distributed ledger platform includes smart contract that allows limitation of a range where transaction data is shared to a range between concerned parties. Therefore, distributed ledgers 14-1 to 14-4 of information management apparatuses 10-1 to 10-4 hold transaction data that are different from one another. Details of distributed ledgers 14-1 to 14-4 will be described later. For example, CORDA® may be adopted as the distributed ledger platform.

As the installed distributed ledger platform software functions, controllers 110-1 to 110-4 (FIG. 3 which will be described later) included in information management apparatuses 10-1 to 10-4 function as nodes 12-1 to 12-4, respectively. Communication among nodes 12-1 to 12-4 over a network NW forms distributed ledger network 2. Information management apparatuses 10-1 to 10-4 are basically similar in configuration to one another. Therefore, when information management apparatuses 10-1 to 10-4 are not particularly distinguished from one another, they may be denoted as an "information management apparatus 10-N." Nodes 12-1 to 12-4 may also be denoted as a "node 12-N" when they are not particularly distinguished from one another.

Distributed ledger network 2 in information management system 1 is a consortium/private network. Platform provider 50 functions as a manager of distributed ledger network 2. Platform provider 50 includes a doorman node 51, a network map node 53, and a notary node 55.

Doorman node 51 approves an application for participation from node 12-N that desires participation into distributed ledger network 2. Doorman node 51 issues a certificate to node 12-N. Node 12-N that participates in distributed ledger network 2 creates a pair of a secret key and a public key at the time of initial start-up and transmits a request for grant of the certificate to doorman node 51. Doorman node 51 verifies an ID or the like of node 12-N and issues the certificate.

Information (for example, an IP address) of registered node 12-N is stored in network map node 53. Network map node 53 functions as a domain name system (DNS) in distributed ledger network 2. Nodes 12-1 to 12-4 that form distributed ledger network 2 recognize a destination of transaction data, for example, based on information provided from network map node 53.

Notary node 55 verifies transaction data proposed by node 12-N and puts a signature to the transaction data. As notary node 55 puts the signature to the transaction data, finality is given to the transaction data. Timing when notary node 55 puts the signature to the transaction data can be set as appropriate depending on specifications of the distributed ledger platform. For example, timing when notary node 55 puts the signature to the transaction data may be after a transaction data sender node puts the signature to the transaction data or after both of a transaction data sender node and a transaction data destination node put the signature to the transaction data.

Node 12-N generates transaction data. As the distributed ledger platform software functions as described above, controller 110-N (FIG. 3) included in information management apparatus 10-N functions as node 12-N.

Figure 3:
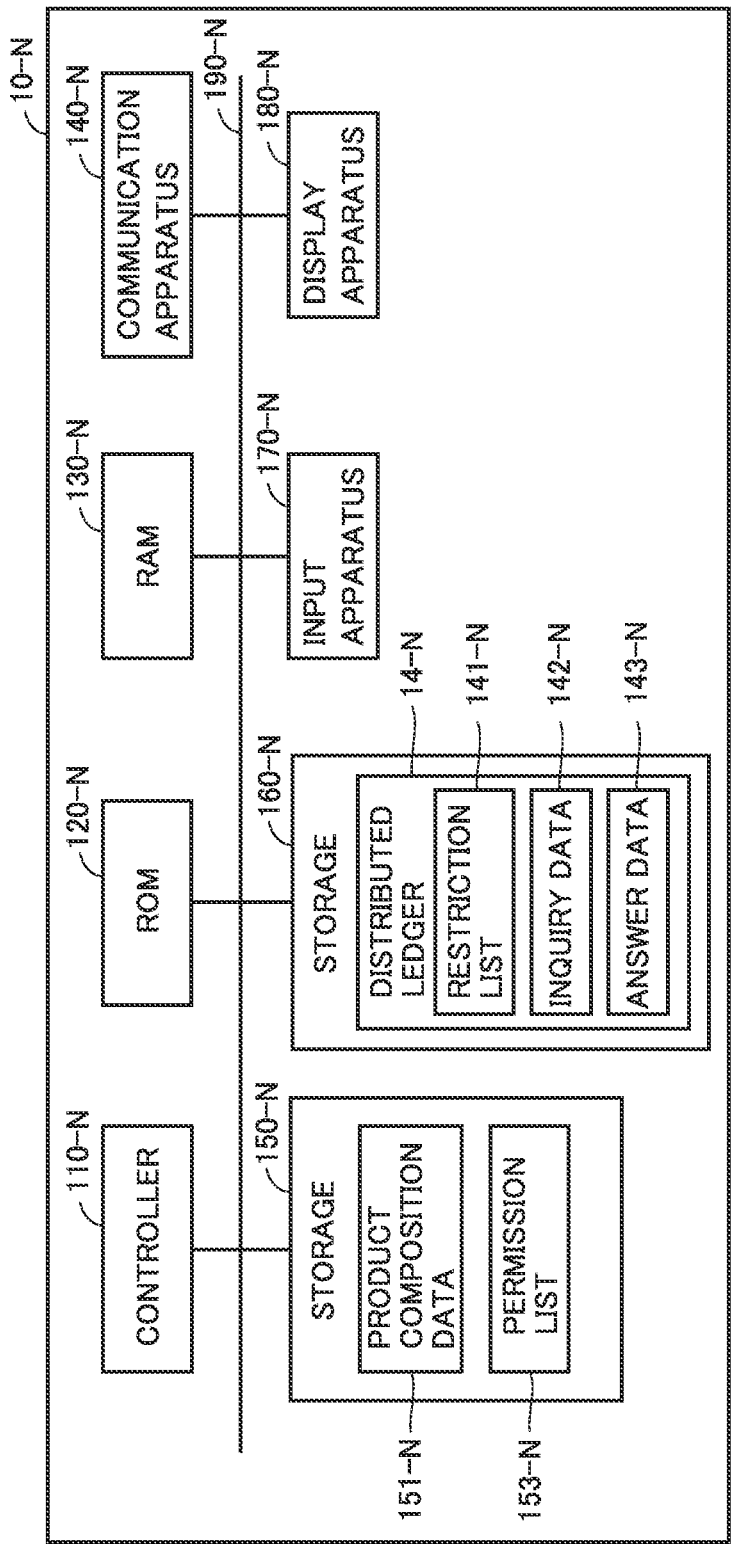
FIG. 3 is a diagram schematically showing a hardware configuration of an information management apparatus.

FIG. 3 is a diagram schematically showing a hardware configuration of information management apparatus 10-N. Information management apparatus 10-N is a computing apparatus including, for example, a server apparatus and a personal computer (PC). Information management apparatus 10-N includes a controller 110-N, a read only memory (ROM) 120-N, a random access memory (RAM) 130-N, a communication apparatus 140-N, a storage 150-N, a storage 160-N, an input apparatus 170-N, and a display apparatus 180-N. Controller 110-N, ROM 120-N, RAM 130-N, communication apparatus 140-N, storage 150-N, storage 160-N, input apparatus 170-N, and display apparatus 180-N are connected to a bus 190-N.

Controller 110-N is implemented, for example, by an integrated circuit including a central processing unit (CPU). Controller 110-N develops various programs stored in ROM 120-N on RAM 130-N and executes the programs. The various programs include, for example, distributed ledger platform software. RAM 130-N functions as a working memory, and various types of data necessary for execution of the various programs are temporarily stored in RAM 130-N. Controller 110-N functions as node 12-N in distributed ledger network 2 by executing the distributed ledger platform software. At the time of initial start-up as node 12-N, controller 110-N generates a secret key and a public key in conformity with a prescribed standard. The public key is sent, for example, to network map node 53 of platform provider 50. Controller 110-N performs a function to generate transaction data. Controller 110-N generates an electronic signature by using the secret key and puts the electronic signature to the transaction data. Controller 110-N performs a function to approve transaction data proposed by another node. Controller 110-N verifies the transaction data proposed by another node, and when it sees no problem in a result of verification, it puts the electronic signature to the transaction data and sends the transaction data back to another node.

Communication apparatus 140-N is configured to communicate with external equipment. The external equipment includes, for example, another information management apparatus included in distributed ledger network 2 and platform provider 50. Communication apparatus 140-N and the external equipment communicate with each other over the Internet, a wide area network (WAN), a local area network (LAN), an Ethernet® network, a public network, a private network, a wired network or a wireless network, or combination thereof. Examples of the external equipment include a server apparatus in an external group that publishes a restricted substance on the Internet. For example, controller 110-N monitors whether or not a new restricted substance has been added by obtaining information on the restricted substance from the server apparatus in the external group in a prescribed cycle through communication apparatus 140-N.

Input apparatus 170-N includes an input device. The input device is, for example, a mouse, a keyboard, a touch panel, and/or another apparatus that can accept an operation by a user.

Display apparatus 180-N includes a display. Display apparatus 180-N shows various images on the display in accordance with a control signal from controller 110-N. The display is, for example, a liquid crystal display, an organic electroluminescence (EL) display, or another display device.

Storage 150-N includes a storage medium such as a hard disk or a flash memory. Information stored in storage 150-N is managed off-chain (on the outside of distributed ledger network 2). Product composition data 151-N of a company's product and a permission list 153-N are stored in storage 150-N. For example, in information management apparatus 10-1 of the A company, product composition data 151-1 includes composition data of the A product. For example, in information management apparatus 10-2 of the B company, product composition data 151-2 includes composition data of the B product. For example, in information management apparatus 10-3 of the C company, product composition data 151-3 includes composition data of the C product. For example, in information management apparatus 10-4 of the D company, product composition data 151-4 includes composition data of the D product.

Permission list 153-N includes information on a company to which disclosure of information is permitted. Specifically, a downstream company in direct business relation in the supply chain is registered in permission list 153-N. For example, in information management apparatus 10-1 of the A company, no company is registered in a permission list 153-1. For example, in information management apparatus 10-2 of the B company, the A company is registered in a permission list 153-2. For example, in information management apparatus 10-3 of the C company, the B company is registered in a permission list 153-3. For example, in information management apparatus 10-4 of the D company, the B company is registered in a permission list 153-4. No answer is given to an inquiry from a company not registered in permission list 153-N. Permission list 153-1 does not have to be stored in a storage 150-1 of information management apparatus 10-1.

A secret key and a public key generated by controller 110-N are stored in storage 150-N. A certificate issued by doorman node 51 of platform provider 50 is stored in storage 150-N.

Storage 160-N includes a storage medium such as a hard disk or a flash memory. Information stored in storage 160-N is managed on-chain (in the inside of distributed ledger network 2). Distributed ledger 14-N is stored in storage 160-N. Distributed ledger 14-N is, for example, a distributed ledger in a directed acyclic graph (DAG) structure. Transaction data included in distributed ledger 14-N forms a partially ordered data model. Transaction data is data representing a transaction and details thereof will be described later.

Distributed ledger 14-N includes a restriction list 141-N, inquiry data 142-N, and answer data 143-N.

Restriction list 141-N is information on a subject substance, that is, information indicating a chemical substance to be reported to a downstream company in information management system 1. Restriction list 141-N includes information on at least one subject substance. Information on the subject substance includes, for example, a CAS number, a name of a substance, a date of update of restriction, and a report threshold value. The CAS number is an identification number specific to a chemical substance provided in a chemical substance registration system in the Chemical Abstracts Service (CAS) of the American Chemical Society. The name of the substance refers to a name of a subject substance. The date of update of restriction refers to a date on which a subject substance is added to restriction list 141-N (date on which a subject substance is subjected to reporting to a downstream company). When the subject substance falls under the restricted substance, the date of update of restriction may be a date on which restriction is imposed under the laws and regulations etc. (for example, the date of designation as the SVHC). The report threshold value is a threshold value of a ratio (content) of a subject substance contained per unit amount of a product. When a content exceeds the report threshold value, information on the subject substance in that product should be given to a downstream company. When the content is equal to or lower than the report threshold value, information on the subject substance does not have to be given.

Information on the subject substance further includes information showing whether or not the subject substance falls under the restricted substance. Information showing whether or not the subject substance falls under the restricted substance is used, for example, for recognizing whether a chemical substance addition of which to restriction list 141-N is proposed falls under the restricted substance or an arbitrary chemical substance.

For example, when information management apparatus 10-N (node 12-N) of any company senses designation of a new restricted substance as the SVHC, information management apparatus 10-N (node 12-N) generates transaction data that proposes addition of the restricted substance newly designated as the SVHC to restriction list 141-N and transmits the transaction data to an information management apparatus (node) of a company in direct business relation. As both of the nodes that have transmitted and received the transaction data put the signature to the transmitted and received transaction data, the transaction data is added to the distributed ledgers held in the information management apparatuses of both of them. Furthermore, the information management apparatus (node) that has received the transaction data has the transaction data propagate to an information management apparatus (node) of a company in direct business relation therewith so that the transaction data that proposes addition of the restricted substance newly designated as the SVHC to the restriction list is sent to all nodes that form distributed ledger network 2. In other words, information on update of restriction list 141-N is shared among all companies included in information management system 1 (forming distributed ledger network 2) by conveyance of information among companies in direct business relation.

Inquiry data 142-N includes information from a downstream company that shows inquiry contents about a subject substance contained in a product (a product supplied to the downstream company). For example, when processing for making an inquiry is performed by an operation onto input apparatus 170-N, information management apparatus 10-N (node 12-N) generates transaction data representing the contents of processing, and the transaction data is transmitted (proposed) to an information management apparatus (node) of a company to which the inquiry is made. As both of the nodes put the signature to the transaction data, the transaction data is added to the distributed ledgers held in the information management apparatuses of both of them.

Answer data 143-N includes, for example, information on a subject substance (the CAS number, the name of the substance, the content, and the like) contained in a product delivered to a downstream company. Answer data 143-N may be transmitted as an answer to inquiry data 142-N, or may voluntarily be transmitted to the downstream company based on addition of a new subject substance to restriction list 141-N. Answer data 143-1 held in information management apparatus 10-1 of the A company may be, for example, information for disclosing a subject substance contained in the A product to an end user.

For example, when processing for giving an answer to an inquiry is performed by an operation onto input apparatus 170-N or automatic processing by controller 110-N, information management apparatus 10-N (node 12-N) generates transaction data representing the contents of processing, and the transaction data is transmitted (proposed) to an information management apparatus (node) of a company to which the inquiry is made (downstream company). As both of the nodes put the signature to the transaction data, the transaction data is added to the distributed ledgers held in the information management apparatuses of both of them.

Distributed ledger 14-N according to the present embodiment is subjective, and distributed ledgers 14-1 to 14-4 hold pieces of data different from one another. This is because a range within which transaction data is shared is limited to a range between concerned parties as described above.

Figure 4:
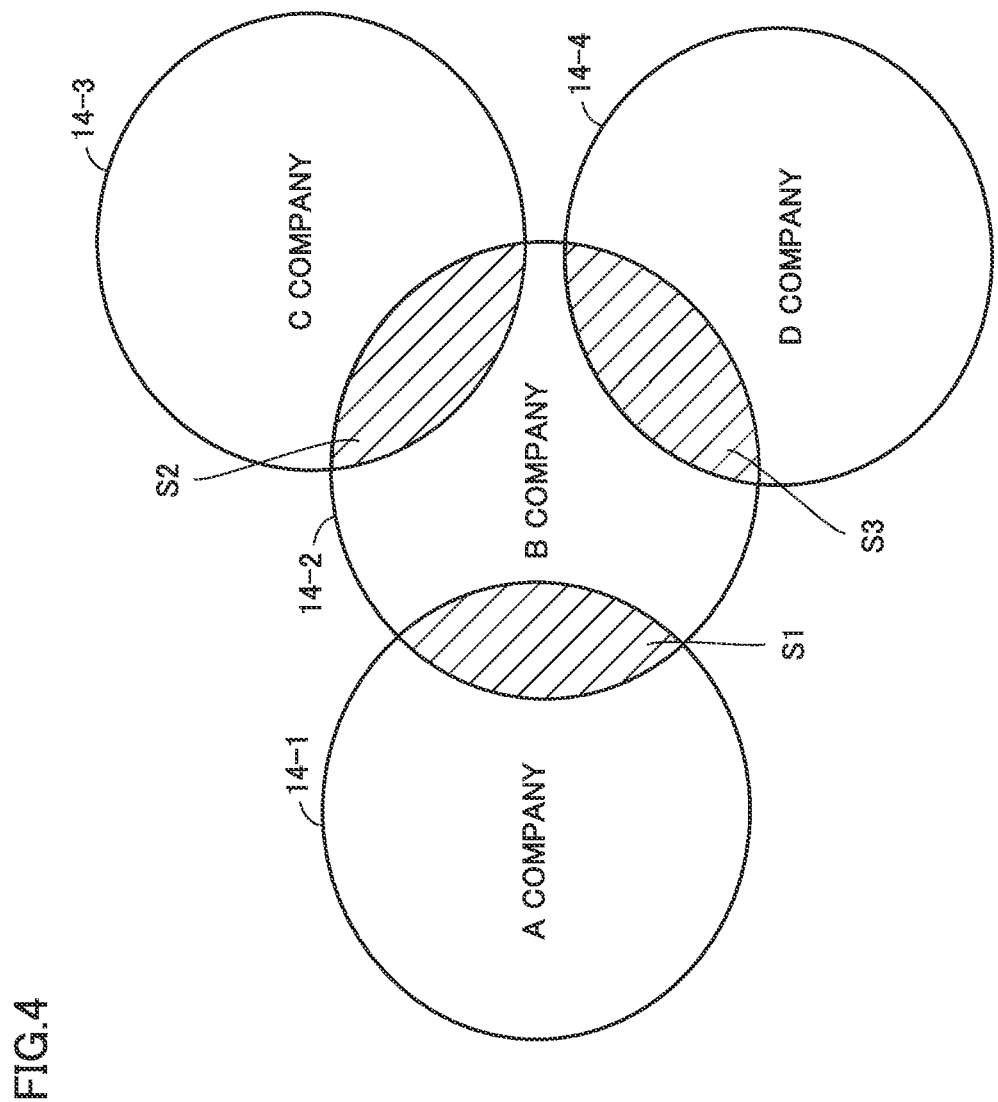
FIG. 4 is a conceptual diagram for illustrating a distributed ledger.

FIG. 4 is a conceptual diagram for illustrating distributed ledger 14-N. FIG. 4 schematically shows relation among distributed ledgers 14-1 to 14-4 stored in respective information management apparatuses 10-1 to 10-4.

Distributed ledger 14-1 and distributed ledger 14-2 share transaction data transmitted and received between information management apparatus 10-1 (node 12-1) of the A company and information management apparatus 10-2 (node 12-2) of the B company (a region S1). In region S1, for example, transaction data on the restriction list transmitted and received between nodes 12-1 and 12-2, transaction data on an inquiry about the restricted substance contained in the B product, and transaction data on an answer to the inquiry are included.

Distributed ledger 14-2 and distributed ledger 14-3 share transaction data transmitted and received between information management apparatus 10-2 (node 12-2) of the B company and information management apparatus 10-3 (node 12-3) of the C company (a region S2). In region S2, for example, transaction data on the restriction list transmitted and received between nodes 12-2 and 12-3, transaction data on an inquiry about the restricted substance contained in the C product, and transaction data on an answer to the inquiry are included.

Distributed ledger 14-2 and distributed ledger 14-4 share transaction data transmitted and received between information management apparatus 10-2 (node 12-2) of the B company and information management apparatus 10-4 (node 12-4) of the D company (a region S3). In region S3, for example, transaction data on the restriction list transmitted and received between nodes 12-2 and 12-4, transaction data on an inquiry about the restricted substance contained in the D product, and transaction data on an answer to the inquiry are included.

For example, from a point of view of the B company which is the midstream company in the supply chain, the B company may not want the A company to grasp information about from which company it purchases the C product and the D product included in the B product. Transaction data includes information on a sender node and a destination node. For example, when transaction data is broadcast to all nodes that form distributed ledger network 2, the A company may know a source of the C product and the D product In information management system 1 in the present embodiment, the range within which transaction data is shared is limited to the range between concerned parties. Therefore, disclosure of information (a company name or the like) on a business partner to a company other than a company in direct business relation can be suppressed.

By performing various functions of information management system 1 while the range within which transaction data is shared is limited to the range between concerned parties, information can quickly be conveyed based on the distributed ledger technology while confidentiality of information is secured. Specific processing in information management system 1 will be described below with reference to three main cases carried out in information management system 1. The three main cases include (1) a case of update of the restriction list, (2) a case of registration of an inquiry, and (3) a case of registration of information on a new product.

<(1) Case of Update of Restriction List>

Figure 5:
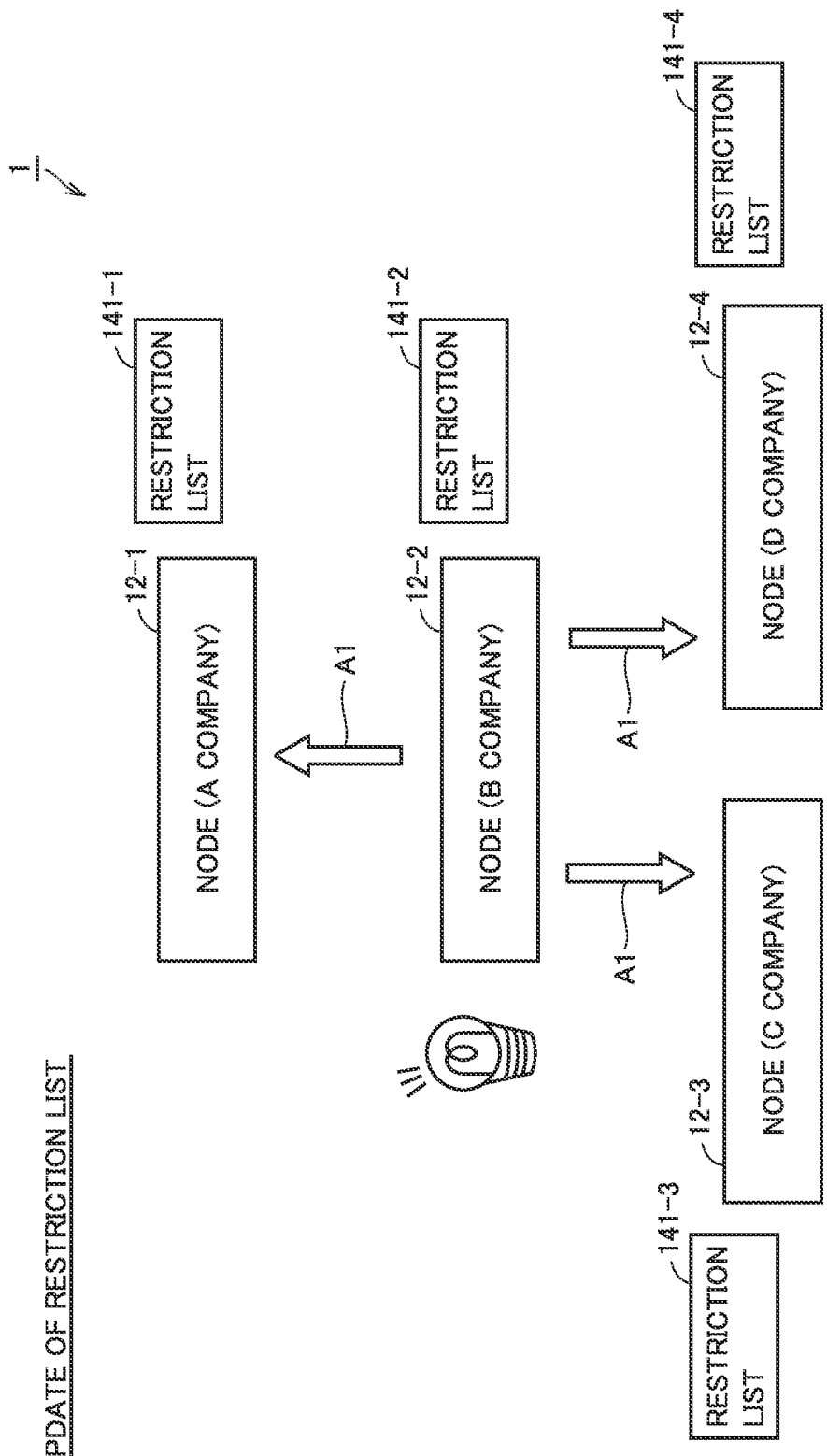
FIG. 5 is a diagram for illustrating a case of update of a restriction list.

FIG. 5 is a diagram for illustrating a case of update of restriction list 141-N. Update of restriction list 141-N refers to addition of a subject substance to restriction list 141-N. Update of restriction list 141-N may include deletion of a subject substance from restriction list 141-N. Addition of a subject substance to a restriction list 141-1 may be proposed, for example, automatically at the time of determination by information management apparatus 10-N as addition of the restricted substance based on information on the restricted substance obtained from a server apparatus or the like in an external group, or at the time when a user of information management apparatus 10-N enters a request for setting an arbitrary chemical substance as the subject substance through input apparatus 170-N. By way of example, for example, it is assumed that a new restricted substance is added to the SVHC and node 12-2 of the B company first sensed the addition. Processing similar to processing which will be described below is performed also when a user of information management apparatus 10-2 of the B company proposes addition of an arbitrary chemical substance as the subject substance.

Node 12-2 of the B company adds a new restricted substance to a restriction list 141-2 and updates restriction list 141-2. Then, node 12-2 of the B company generates transaction data that proposes addition of the new restricted substance to restriction lists 141-1, 141-3, and 141-4 for adding the new restricted substance as the subject substance also to other restriction lists 141-1, 141-3, and 141-4. Specifically, node 12-2 of the B company generates three pieces of transaction data to be transmitted to node 12-1 of the A company, node 12-3 of the C company, and node 12-4 of the D company in direct business relation, respectively. The transaction data to be transmitted to node 12-1 of the A company includes, for example, information on a sender (the B company) of the transaction data, information on a destination (the A company) of the transaction data, and information representing a type of a transaction, the CAS number, the name of the substance, the date of update of restriction, the report threshold value, and whether or not a substance falls under the restricted substance. The type of the transaction represents contents proposed by the transaction. The type of the transaction in this case represents "addition of the subject substance." In the transaction data to be transmitted to node 12-3 of the C company and node 12-4 of the D company, information on the destination is changed to node 12-3 of the C company and node 12-4 of the D company as compared with the transaction data to be transmitted to the A company.

Node 12-2 puts the electronic signature to the generated transaction data and transmits the transaction data to other nodes 12-1, 12-3, and 12-4 (an arrow A1). As nodes 12-1, 12-3, and 12-4 approve the received transaction data (proposed transaction data), the transaction data is added to distributed ledgers 14-1 to 14-4. Specifically, when node 12-1 receives the transaction data from node 12-2, it verifies the transaction data. A technique for verification may be, for example, a verification technique using an electronic signature (the electronic signature of the B company) put to the transaction data or other known verification techniques. In the present embodiment, node 12-1 verifies also accuracy of information representing whether or not a substance falls under the restricted substance. An answer may be (legally) be obligatory for the restricted substance, whereas it is not obligatory to give an answer for an arbitrary chemical substance. From a point of view of company needs that a company is unwilling to disclose composition data which may be a trade secret, whether the subject substance falls under a restricted substance or an arbitrary chemical substance is an important concern for the company. For example, when information showing whether or not a substance falls under the restricted substance included in transaction data indicates the restricted substance, node 12-1 obtains data on the restricted substance from the outside (a server apparatus or the like in an external group) and confirms that the proposed chemical substance falls under the restricted substance. When information showing whether or not a substance falls under the restricted substance included in transaction data indicates an arbitrary chemical substance, node 12-1 obtains data on the restricted substance from the outside and confirms that the proposed chemical substance does not fall under the restricted substance. After node 12-1 finishes verification of contents of the transaction data, node 12-1 puts the electronic signature to the transaction data to approve the transaction data and sends the transaction data back to node 12-2. Nodes 12-1 and 12-2 add the transaction data (the transaction data to which the electronic signatures of both of nodes 12-1 and 12-2 are put) to distributed ledgers 14-1 and 14-2, respectively. As the transaction data is held in distributed ledger 14-1, restriction list 141-1 of the A company is updated. When node 12-1 does not approve the transaction data, the transaction data is not added to distributed ledgers 14-1 and 14-2 and restriction list 141-1 of the A company is not updated.

Similarly, as node 12-3 approves the transaction data from node 12-2, the transaction data is added to distributed ledgers 14-2 and 14-3. As the transaction data is held in distributed ledger 14-3, restriction list 141-3 of the C company is updated.

As node 12-4 approves the transaction data from node 12-2, the transaction data is added to distributed ledgers 14-2 and 14-4. As the transaction data is held in distributed ledger 14-4, restriction list 141-4 of the D company is updated.

When the A company first proposes update of restriction list 141-N, transaction data that proposes update of restriction list 141-N propagates from node 12-1 of the A company to node 12-2 of the B company. Then, node 12-2 of the B company has the transaction data that proposes update of restriction list 141-N propagate to node 12-3 of the C company and node 12-4 of the D company regardless of approval of the transaction data by node 12-2 itself.

In information management system 1 according to the present embodiment, each node can approve and deny a proposal to update restriction list 141-N. Specific description will be given with reference to FIGS. 6 and 7. Denial of the proposal will be described with reference to FIG. 7.

Figure 6:
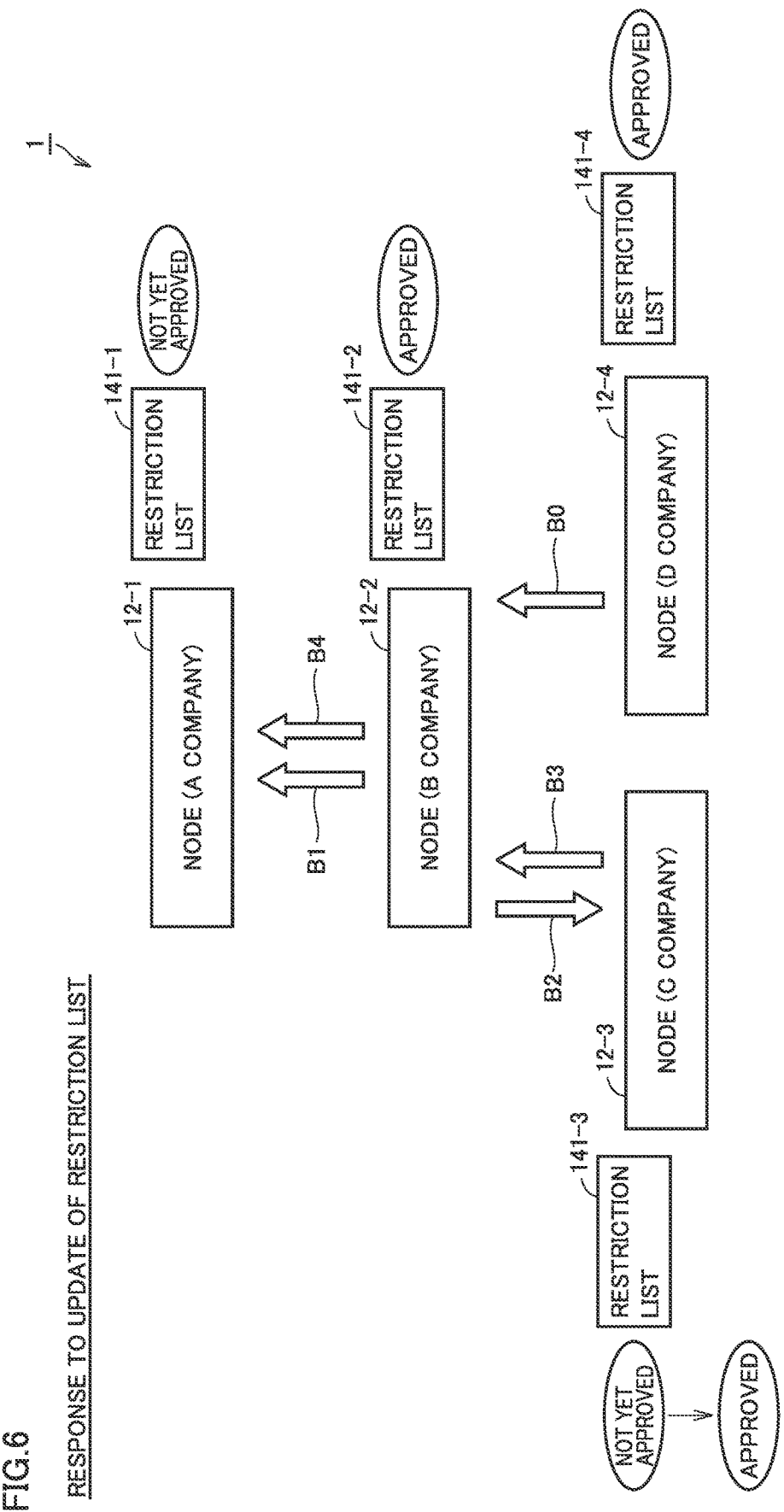
FIG. 6 is a diagram for illustrating an exemplary process for updating the restriction list.

FIG. 6 is a diagram for illustrating an exemplary process for updating restriction list 141-N. As described with reference to FIG. 5, it is assumed that any node 12-N (for example, node 12-2 of the B company) generates transaction data that proposes addition of a subject substance to restriction list 141-N and this transaction data propagates to all nodes. A chemical substance addition of which as the subject substance is proposed is also referred to as a "new subject substance" below. In FIG. 6, it is assumed that information showing whether or not a substance falls under the restricted substance that is included in the transaction data is correctly entered.

In the example shown in FIG. 6, the B company and the D company approve proposal for update of restriction list 141-N. The A company and the C company have not approved proposal for update of restriction list 141-N.

Though node 12-4 of the D company has not received an inquiry about a new subject substance from node 12-2 of the B company, being triggered by approval of the proposal for update of restriction list 141-4, it reports to node 12-2 of the B company, composition data of the D product to which information on the new subject substance has been added (an arrow B0). Specifically, as node 12-4 of the D company approves the proposal for update of restriction list 141-4, it uses product composition data 151-4 to prepare composition data of the D product to which information on the new subject substance has been added as answer data 143-4. Then, node 12-4 of the D company transmits transaction data reporting prepared answer data 143-4 to node 12-2 of the B company.

Node 12-2 of the B company verifies the transaction data that reports answer data 143-4 received from node 12-4 of the D company, and thereafter when node 12-2 sees no problem in a result of verification of the transaction data, node 12-2 approves the transaction data. Contents in answer data 143-4 are thus held in distributed ledger 14-2 of the B company as answer data 143-2. Node 12-2 of the B company uses information on the new subject substance contained in the D product included in the composition data of the D product to update product composition data 151-2 of the B product.

Though node 12-2 of the B company has not received an inquiry about the new subject substance from node 12-1 of the A company, it reports composition data of the B product to which information on the new subject substance has been added to node 12-1 of the A company, because it has approved the proposal for update of restriction list 141-2. Node 12-2 of the B company prepares as answer data 143-2, composition data of the B product on which information on the new subject substance contained in the D product has been reflected. This answer data 143-2 does not include information for identifying the D company. Node 12-2 of the B company transmits transaction data reporting prepared answer data 143-2 to node 12-1 of the A company (an arrow B1). Since information on the new subject substance contained in the C product is not reflected on this answer data 143-2, node 12-2 of the B company gives answer data 143-2 as a partially completed report to node 12-1 of the A company.

Node 12-1 of the A company verifies the transaction data received from node 12-2 of the B company, and thereafter when node 12-1 sees no problem in a result of verification of the transaction data, node 12-1 approves the transaction data. Contents in answer data 143-2 are thus held in distributed ledger 14-1 of the A company as answer data 143-1.

Since node 12-3 of the C company has not approved the proposal for update of restriction list 141-N, it has not transmitted to the B company, composition data of the C product to which information on the new subject substance has been added. When node 12-2 of the B company recognizes that it has not yet obtained the composition data of the C product to which information on the new subject substance had been added from node 12-3 of the C company, it prepares inquiry data 142-2 for obtaining the composition data of the C product to which information on the new subject substance had been added, and transmits transaction data requesting for an answer to contents in inquiry data 142-2 to node 12-3 of the C company (an arrow B2). At this time, node 12-2 of the B company does not make an inquiry to node 12-4 of the D company from which it has already obtained the composition data of the D product to which information on the new subject substance had been added.

Node 12-3 of the C company verifies the transaction data received from node 12-2 of the B company, and thereafter when node 12-3 sees no problem in a result of verification of the transaction data, node 12-3 approves the transaction data. Contents in inquiry data 142-2 are thus held in distributed ledger 14-3 of the C company as inquiry data 142-3. For example, a manager or a user of information management apparatus 10-3 considers disclosure of information on the new subject substance. When determination that there is no problem in disclosure of information on the new subject substance is made as a result of consideration, the manager or the user of information management apparatus 10-3 performs an operation to approve update of restriction list 141-3. As update of restriction list 141-3 is approved, node 12-3 of the C company uses product composition data 151-3 to prepare as answer data 143-3, composition data of the C product to which information on the new subject substance has been added. Then, node 12-3 of the C company transmits transaction data reporting prepared answer data 143-3 to node 12-2 of the B company (an arrow B3).

Node 12-2 of the B company verifies the transaction data received from node 12-3 of the C company, and thereafter when node 12-2 sees no problem in a result of verification of the transaction data, node 12-2 approves the transaction data. Contents in answer data 143-3 are thus held in distributed ledger 14-2 of the B company as answer data 143-2. Node 12-2 of the B company uses information on the new subject substance contained in the C product to update product composition data 151-2 of the B product. Then, for reporting to the A company, composition data of the B product on which information on the new subject substance contained in the C product has been reflected is prepared as answer data 143-2. On this answer data 143-2, information on the subject substance contained in both of the C product and the D product included in the B product is reflected. Therefore, node 12-2 of the B company finalizes prepared answer data 143-2 as a complete report and transmits the transaction data reporting prepared answer data 143-2 to node 12-1 of the A company (an arrow B4). This answer data 143-2 does not include information for identifying the C company and the D company.

Node 12-1 of the A company verifies the transaction data received from node 12-2 of the B company, and thereafter when node 12-1 sees no problem in a result of verification of the transaction data, node 12-1 approves the transaction data. Contents in answer data 143-2 are thus held in distributed ledger 14-1 of the A company as answer data 143-1.

When node 12-2 of the B company finishes the complete report to node 12-1 of the A company that has responded to update of restriction list 141-2, it sets a completion flag. Then, node 12-2 of the B company transmits transaction data indicating completion of the complete report about update of restriction list 141-2 to node 12-1 of the A company. Node 12-1 of the A company verifies the transaction data received from node 12-2 of the B company, and thereafter when node 12-1 sees no problem in a result of verification of the transaction data, node 12-1 approves the transaction data. Processing for update of restriction list 141-N is thus completed.

Figure 7:
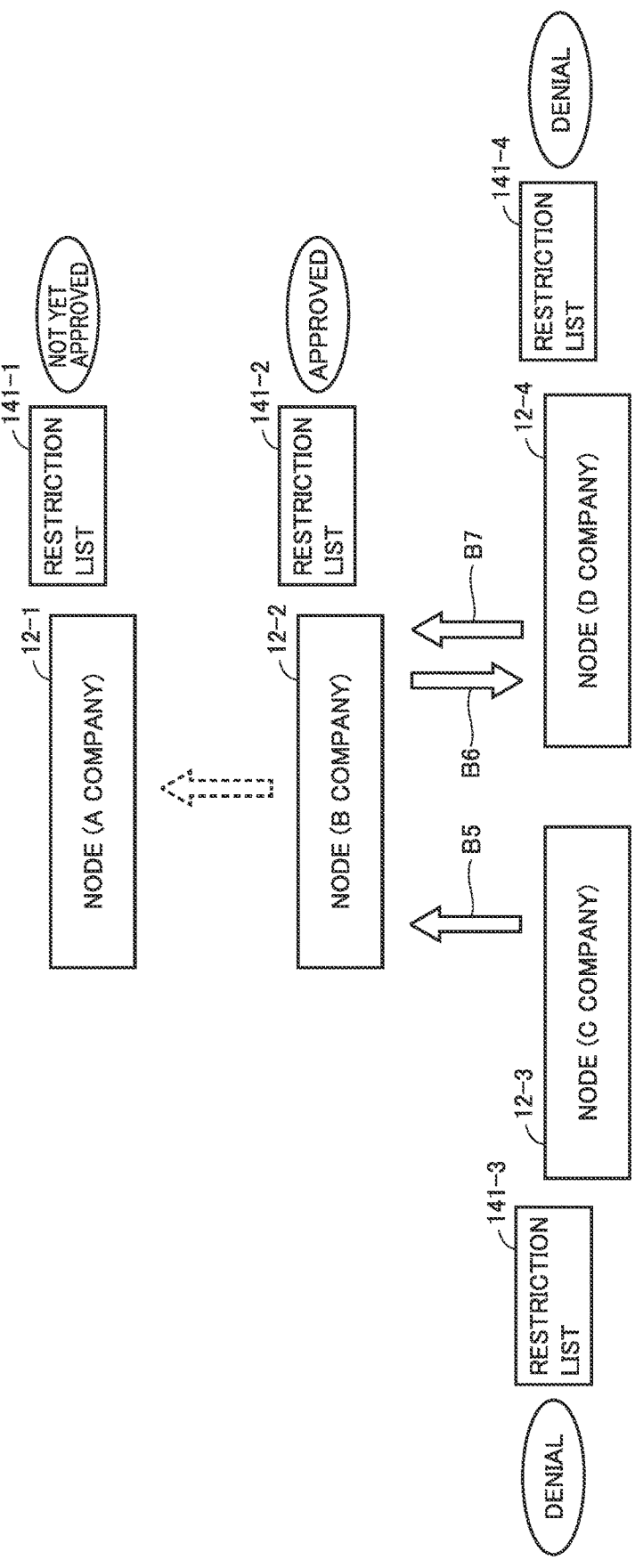
FIG. 7 is a diagram for illustrating another exemplary process for updating the restriction list.

FIG. 7 is a diagram for illustrating another exemplary process for updating restriction list 141-N. It is assumed also in FIG. 7 that any node 12-N (for example, node 12-2 of the B company) generates transaction data that proposes addition of a subject substance to restriction list 141-N and this transaction data propagates to all nodes. In FIG. 7, it is assumed that information showing whether or not a substance falls under the restricted substance that is included in the transaction data indicates a "restricted substance," however, this input is incorrect and the information should have indicated an "arbitrary chemical substance." Processing similar to processing which will be described below is performed also when information showing whether or not a substance falls under the restricted substance that is included in the transaction data indicates an "arbitrary chemical substance," however, the information should have indicated a "restricted substance."

In the example shown in FIG. 7, the B company is an entity that has proposed update of restriction list 141-N, and hence it has approved the proposal for update of restriction list 141-N. The A company has not yet approved (verified) the proposal for update of restriction list 141-N. The C company and the D company have denied the proposal for update of restriction list 141-N.

Node 12-3 of the C company verifies transaction data that proposes addition of the subject substance to restriction list 141-3 received from node 12-2 of the B company, and determines that this proposal is incorrect. Specifically, node 12-3 of the C company determines that information showing whether or not a substance falls under the restricted substance is incorrect, for example, by obtaining data on the restricted substance from the outside (a server apparatus or the like in an external group) and checking whether or not the proposed new subject substance falls under the restricted substance. Node 12-3 of the C company does not approve the proposal for addition of the new subject substance to restriction list 141-3 and transmits transaction data that denies the proposal to node 12-2 of the B company (an arrow B5).

When node 12-2 of the B company receives the transaction data representing denial from node 12-3 of the C company, it has information indicating denial shown on a display apparatus 180-2 and waits for an input from the user in the B company. For example, the user in the B company verifies input information at the time of proposal for addition of the subject substance to restriction list 141-3, and when the user finds an error, the user can correct the input information and make a proposal again. Examples of the error include an error in entry of information showing whether or not a substance falls under the restricted substance, an error in entry of the CAS number, and an error in entry of the name of the substance.

Depending on timing of verification of transaction data that proposes addition of the subject substance to restriction list 141-N by a node (for example, node 12-4 of the D company) that receives the transaction data, an inquiry from the node that has transmitted the transaction data may be sent before the node that has received the transaction data denies the transaction data.

Node 12-4 of the D company has not finished verification of the transaction data that proposes addition of the subject substance to restriction list 141-4. When node 12-2 of the B company recognizes that it has not yet obtained from node 12-4 of the D company, composition data of the D product to which information on the new subject substance had been added, it prepares inquiry data 142-2 for obtaining the composition data of the D product to which information on the new subject substance had been added and transmits to node 12-4 of the D company, transaction data that requests for an answer to contents of inquiry data 142-2 (an arrow B6).

Node 12-4 of the D company verifies the transaction data received from node 12-2 of the B company, and thereafter when node 12-4 sees no problem in a result of verification of the transaction data, node 12-4 approves the transaction data. Contents in inquiry data 142-2 are thus held in distributed ledger 14-4 of the D company as inquiry data 142-4. Node 12-4 of the D company verifies the transaction data that proposes addition of the subject substance to restriction list 141-4 received from node 12-2 of the B company. Then, node 12-4 of the D company determines that the transaction data is incorrect. Node 12-4 of the D company does not approve the proposal for addition of the new subject substance to restriction list 141-4 and transmits transaction data that denies the proposal to node 12-2 of the B company (an arrow B7).

Processing performed by node 12-2 of the B company that receives the transaction data indicating denial is similar to processing in an example of reception of the transaction data indicating denial from node 12-3 of the C company.

The proposal for update of restriction list 141-N made by a certain node may be incorrect. As node 12-N performs a function to deny a proposal for update of restriction list 141-N from another node, it can double-check contents of the proposal, as information management system 1 so to speak. With the ability to deny an incorrect proposal, disclosure of information more than necessary can be suppressed.

<(2) Case of Registration of Inquiry>

An inquiry is made from a downstream company in the supply chain to an upstream company in direct business relation. The downstream company can make an inquiry about a composition of a purchased product to the upstream company in direct business relation at arbitrary timing. An inquiry is registered, for example, when no report has been made about a subject substance included in restriction list 141-N. For example, a scene where some company has not approved update of restriction list 141-N in the supply chain is assumed. A case in which an inquiry about the B product is made from the A company to the B company will be described by way of example.

Figure 8:
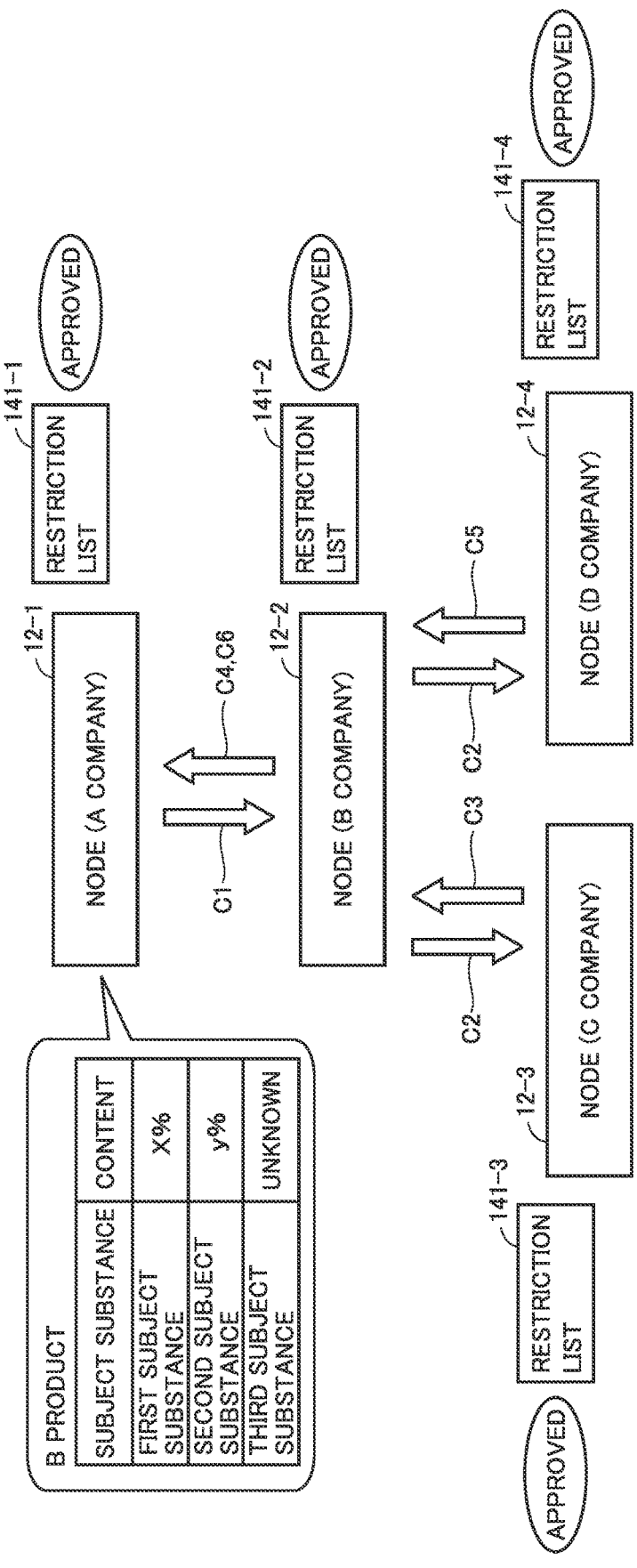
FIG. 8 is a diagram for illustrating a case of registration of an inquiry.

FIG. 8 is a diagram for illustrating a case of registration of an inquiry. In FIG. 8, an inquiry about the B product from the A company to the B company is made. It is assumed that the subject substance contained in the B product has been approved by all nodes 12-1 to 12-4 and registered in restriction lists 141-1 to 141-4. The subject substance contained in the B product includes first to third subject substances. The A company has received a report about composition data (a content here) of the first subject substance and the second subject substance in connection with the B product, whereas it has not received a report about composition data of the third subject sub stance.

Initially, node 12-1 of the A company checks whether or not the third subject substance which is an inquiry purpose is included in restriction list 141-1, and when the third subject substance is not included in restriction list 141-1, node 12-1 performs above-described processing (processing for update of the restriction list) for adding the third subject substance to restriction list 141-1. When node 12-1 of the A company confirms that the third subject substance which is the inquiry purpose is included in restriction list 141-1, node 12-1 of the A company prepares inquiry data 142-1 for making an inquiry about the B product to node 12-2 of the B company, and generates transaction data that requests for an answer to contents of inquiry data 142-1. The transaction data includes, for example, information on a sender (the A company) of the transaction data, information on a destination (the B company) of the transaction data, a type of a transaction, model number information for identifying the B product, and the inquiry purpose. The type of the transaction represents a "request for disclosure of the composition." The model number information for identifying the B product may be, for example, model number information for managing the B product in the B company. For example, a table of correspondence between model number information for managing the B product in the A company and model number information for managing the B product in the B company may be prepared in advance, and the user in the A company may be able to enter model number information for managing the B product in the A company at the time of preparation of inquiry information. For example, input model number information for managing the B product in the A company may be converted to model number information for node 12-1 to manage the B product in the B company and the model number information may be included in transaction data. The inquiry purpose may be selected, for example, from the "content" and "presence/absence". When the "content" is selected as the inquiry purpose, the content for each subject substance contained in the B product is given as an answer to the inquiry, for example, in a form of a list. Alternatively, when "presence/absence" is selected as the inquiry purpose, all subject substances contained in the B product are given as an answer to the inquiry, for example, in a form of a list. Node 12-1 of the A company transmits generated transaction data to node 12-2 of the B company (an arrow C1).

Node 12-2 of the B company verifies the transaction data received from node 12-1 of the A company, and thereafter when node 12-2 sees no problem in a result of verification of the transaction data, node 12-2 approves the transaction data. Contents in inquiry data 142-1 are thus held in distributed ledger 14-2 of the B company as inquiry data 142-2. Node 12-2 of the B company prepares inquiry data 142-2 that makes an inquiry about the C product included in the B product and generates transaction data that requests for an answer to contents in inquiry data 142-2. Node 12-2 of the B company prepares inquiry data 142-2 that makes an inquiry about the D product included in the B product and generates transaction data that requests for an answer to contents of inquiry data 142-2. The transaction data that makes an inquiry about the C product includes, for example, information on a sender (the B company) of the transaction data, information on a destination (the C company) of the transaction data, a type of a transaction, model number information for identifying the C product, and an inquiry purpose. The transaction data that makes an inquiry about the D product includes, for example, information on a sender (the B company) of the transaction data, information on a destination (the D company) of the transaction data, a type of a transaction, model number information for identifying the D product, and an inquiry purpose. Node 12-2 of the B company transmits the transaction data for making an inquiry about the C product and the transaction data that makes an inquiry about the D product to node 12-3 of the C company and node 12-4 of the D company, respectively (an arrow C2).

Node 12-3 of the C company verifies the transaction data received from node 12-2 of the B company, and thereafter when node 12-3 sees no problem in a result of verification of the transaction data, node 12-3 approves the transaction data. Contents in inquiry data 142-2 are thus held in distributed ledger 14-3 of the C company as inquiry data 142-3. Since there is no company upstream from the C company itself in connection with the C product, node 12-3 of the C company prepares composition data of the C product as answer data 143-3. Then, node 12-3 of the C company transmits transaction data reporting prepared answer data 143-3 to node 12-2 of the B company (an arrow C3).

Node 12-2 of the B company verifies the transaction data received from node 12-3 of the C company, and thereafter when node 12-2 sees no problem in a result of verification of the transaction data, node 12-2 approves the transaction data. Contents in answer data 143-3 are thus held in distributed ledger 14-2 of the B company as answer data 143-2. Node 12-2 of the B company uses information on the subject substance contained in the C product to update product composition data 151-2 of the B product. Then, for reporting to the A company, node 12-2 prepares as answer data 143-2, composition data of the B product on which information on the subject substance contained in the C product is reflected. This answer data 143-2 does not include information for identifying the C company. Node 12-2 of the B company transmits transaction data reporting prepared answer data 143-2 to node 12-1 of the A company (an arrow C4). Since information on the subject substance contained in the D product is not reflected on this answer data 143-2, node 12-2 of the B company transmits this answer data 143-2 to node 12-1 of the A company as the partially completed report. Node 12-1 of the A company verifies the transaction data received from node 12-2 of the B company, and thereafter when node 12-1 sees no problem in a result of verification of the transaction data, node 12-1 approves the transaction data. Contents in answer data 143-2 are thus held in distributed ledger 14-1 of the A company as answer data 143-1.

Node 12-4 of the D company verifies the transaction data received from node 12-2 of the B company, and thereafter when node 12-4 sees no problem in a result of verification of the transaction data, node 12-4 approves the transaction data. Contents in inquiry data 142-2 are thus held in distributed ledger 14-4 of the D company as inquiry data 142-4. Since there is no company upstream from the D company itself in connection with the D product, node 12-4 of the D company prepares composition data of the D product as answer data 143-4. Then, node 12-4 of the D company transmits transaction data reporting prepared answer data 143-4 to node 12-2 of the B company (an arrow C5).

Node 12-2 of the B company verifies the transaction data received from node 12-4 of the D company, and thereafter when node 12-2 sees no problem in a result of verification of the transaction data, node 12-2 approves the transaction data. Contents in answer data 143-4 are thus held in distributed ledger 14-2 of the B company as answer data 143-2. Node 12-2 of the B company uses information on the subject substance contained in the D product to update product composition data 151-2 of the B product. Then, for reporting to the A company, node 12-2 prepares as answer data 143-2, composition data of the B product on which information on the subject substance contained in the D product is reflected. On this answer data 143-2, information on the subject substance contained in both of the C product and the D product included in the B product is reflected. Therefore, node 12-2 of the B company finalizes prepared answer data 143-2 as a complete report and transmits transaction data reporting prepared answer data 143-2 to node 12-1 of the A company (an arrow C6). This answer data 143-2 does not include information for identifying the C company and the D company.

Node 12-1 of the A company verifies the transaction data received from node 12-2 of the B company, and thereafter when node 12-1 sees no problem in a result of verification of the transaction data, node 12-1 approves the transaction data. Contents in answer data 143-2 are thus held in distributed ledger 14-1 of the A company as answer data 143-1.

When node 12-2 of the B company finishes the complete report about the inquiry from node 12-1 of the A company, it sets a completion flag. Then, node 12-2 of the B company transmits transaction data indicating completion of the complete report about the inquiry to node 12-1 of the A company. Node 12-1 of the A company verifies the transaction data received from node 12-2 of the B company, and thereafter when node 12-1 sees no problem in a result of verification of the transaction data, node 12-1 approves the transaction data. A series of processing from an inquiry to an answer is thus completed.

<(3) Case of Registration of Information on New Product>

When a new product is released, information management apparatus 10-N of a company that releases the new product adds composition data of the new product to product composition data 151-N. When node 12-N senses addition of the composition data of the new product to product composition data 151-N, node 12-N obtains the composition data of the product from a node of an upstream company from which a product included in the new product is purchased, and prepares composition data of the new product. Then, node 12-N provides information on the subject substance contained in the new product to a node of a downstream company to which the new product is supplied. A case of addition of the new product by the B company will be described by way of example.

Figure 9:
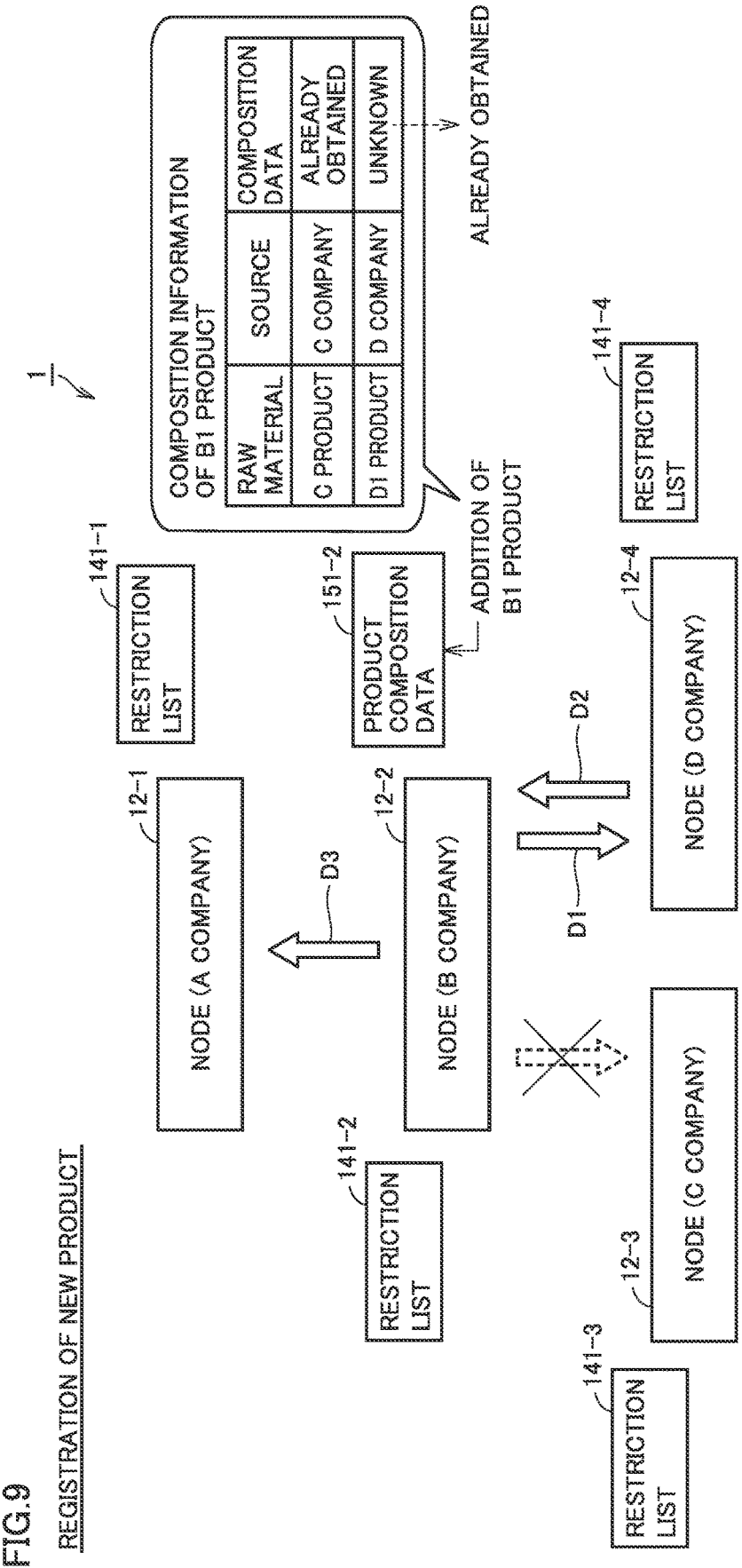
FIG. 9 is a diagram for illustrating a case of registration of information on a new product.

FIG. 9 is a diagram for illustrating a case of registration of information on a new product. FIG. 9 shows a case of addition of the new product by the B company. It is assumed that a B1 product is added as the new product and composition data of the B1 product is added to product composition data 151-2. Then, it is assumed that the B1 product includes the C product supplied by the C company and a D1 product supplied by the D company. Since the C product is included also in the B product which is an existing product, the B company has already obtained the information on the subject substance contained in the C product. On the other hand, the D1 product is a product newly supplied from the D company, and the B company does not have information on the subject substance contained in the D1 product. In order to give the information on the subject substance contained in the B1 product to the A company that purchases the B1 product, the B company should obtain from the D company, information on the subject substance contained in the D1 product (composition data of the D1 product).

Node 12-2 of the B company generates transaction data for making an inquiry about the D1 product to node 12-4 of the D company. The transaction data includes, for example, information on a sender (the B company) of the transaction data, information on a destination (the D company) of the transaction data, a type of a transaction, model number information for identifying the D1 product, and the inquiry purpose. Since the inquiry is as described in <(2) Case of Registration of Inquiry> described above, description will not be repeated. Node 12-2 of the B company transmits the generated transaction data to node 12-4 of the D company (an arrow D1). Since information on the subject substance contained in the C product has already been obtained, node 12-2 of the B company does not make an inquiry to node 12-3 of the C company.

Node 12-4 of the D company verifies the transaction data received from node 12-2 of the B company, and thereafter when node 12-4 sees no problem in a result of verification of the transaction data, node 12-4 approves the transaction data. Since there is no company upstream from the D company itself in connection with the D1 product, node 12-4 of the D company prepares composition data of the D1 product as answer data 143-4. Then, node 12-4 of the D company transmits transaction data reporting prepared answer data 143-4 to node 12-2 of the B company (an arrow D2).

Node 12-2 of the B company verifies the transaction data received from node 12-4 of the D company, and thereafter when node 12-2 sees no problem in a result of verification of the transaction data, node 12-2 approves the transaction data. Node 12-2 of the B company uses information on the subject substance contained in the D1 product to update product composition data 151-2 of the B1 product. Then, for reporting to the A company, composition data of the B1 product on which information on the new subject substance contained in the D1 product has been reflected is prepared as answer data 143-2. On this answer data 143-2, information on the subject substance contained in both of the C product and the D1 product included in the B1 product is reflected. Therefore, node 12-2 of the B company finalizes prepared answer data 143-2 as a complete report and transmits transaction data reporting prepared answer data 143-2 to node 12-1 of the A company (an arrow D3). Answer data 143-2 does not include information for identifying the C company and the D company. Node 12-1 of the A company verifies the transaction data received from node 12-2 of the B company, and thereafter when node 12-1 sees no problem in a result of verification of the transaction data, node 12-1 approves the transaction data. A series of processing for addition of the new product is thus completed.

If a C product is also a product newly supplied from the C company, node 12-2 of the B company obtains information on the subject substance contained in the C product from the C company as in the case of the D1 product. In this case, node 12-2 of the B company waits for both of the information on the subject substance contained in the C product and the information on the subject substance contained in the D1 product to be ready, and prepares as answer data 143-2, the composition data of the B1 product on which both of these pieces of information are reflected. At the time of registration of information on the new product, the A company does not hold information on the B1 product. Therefore, even when the A company receives a partially completed report about the B1 product from the B company, it may be difficult for the A company to manage the information. Therefore, at the time of registration of information of the new product, node 12-2 of the B company does not give a partially completed report about the B1 product but gives a complete report.

<Functional Block of Node>

Figure 10:
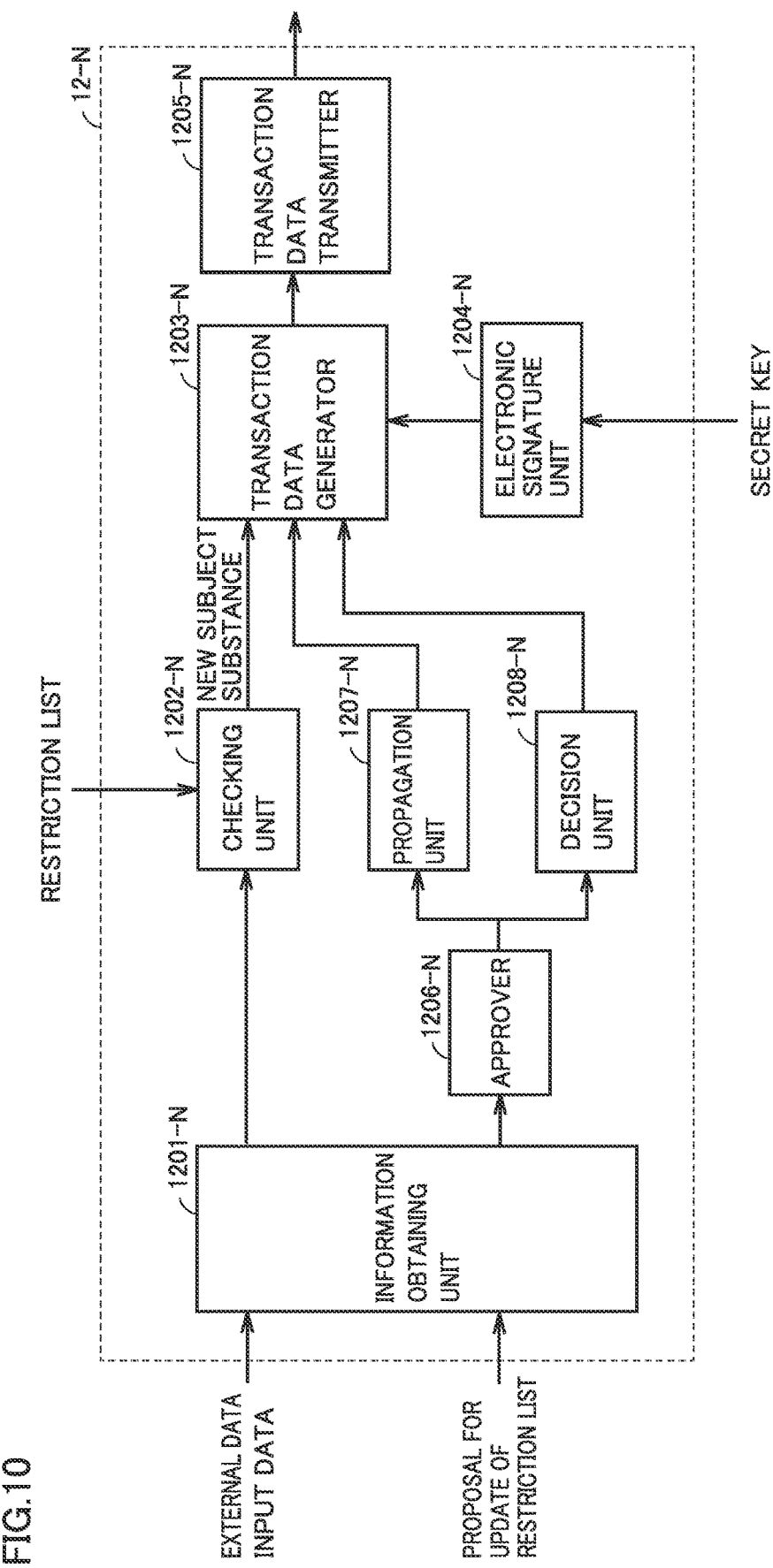
FIG. 10 is a functional block diagram of a controller (node) relating to a function to update the restriction list.

FIG. 10 is a functional block diagram of controller 110-N (node 12-N) relating to a function to update restriction list 141-N. FIG. 10 shows a function of node 12-N to request another node to add a subject substance to restriction list 141-N and a function to respond to a request for addition of the subject substance to restriction list 141-N received from another node. Referring to FIG. 10, node 12-N includes an information obtaining unit 1201-N, a checking unit 1202-N, a transaction data generator 1203-N, an electronic signature unit 1204-N, a transaction data transmitter 1205-N, an approver 1206-N, a propagation unit 1207-N, and a decision unit 1208-N.

<<Functional Block of Node: Function to Request for Addition of Subject Substance>>

Information obtaining unit 1201-N, checking unit 1202-N, transaction data generator 1203-N, electronic signature unit 1204-N, and transaction data transmitter 1205-N perform a function to request another node to add a subject substance to restriction list 141-N.

Information obtaining unit 1201-N obtains data on a restricted substance (external data) from the outside (a server apparatus or the like in an external group) of information management apparatus 10-N through communication apparatus 140-N. Information obtaining unit 1201-N obtains external data from the outside of information management system 1, for example, every prescribed cycle. The prescribed cycle can be set as appropriate depending on characteristics or the like of information management system 1. Information obtaining unit 1201-N obtains a request (input data) for setting an arbitrary chemical substance as the subject substance that is entered through input apparatus 170-N. A user of information management apparatus 10-N can enter a chemical substance to be managed in information management system 1 (a chemical substance to be set as the subject substance) into input apparatus 170-N and can have information obtaining unit 1201-N obtain the entered information as input data. Information obtaining unit 1201-N provides external data and/or input data to checking unit 1202-N.

Checking unit 1202-N reads restriction list 141-N from storage 160-N and checks the external data and/or the input data received from information obtaining unit 1201-N against restriction list 141-N. When the chemical substance shown in the external data and/or the input data is already included in restriction list 141-N, checking unit 1202-N discards the external data and/or the input data. When the chemical substance shown in the external data and/or the input data is not included in restriction list 141-N, checking unit 1202-N sets the chemical substance shown in the external data and/or the input data as a new subject substance, and provides information on the new subject substance to transaction data generator 1203-N.

Transaction data generator 1203-N generates transaction data that makes a proposal. The transaction data generated in this case includes, for example, information on a sender of the transaction data, information on a destination of the transaction data, a type of a transaction (addition of the subject substance), a name of the subject substance, and the CAS number of the subject substance.

Transaction data generator 1203-N obtains the electronic signature from electronic signature unit 1204-N. Then, transaction data generator 1203-N puts the electronic signature to the transaction data.

Electronic signature unit 1204-N reads the secret key from storage 150-N. Electronic signature unit 1204-N uses the secret key to generate the electronic signature. For example, electronic signature unit 1204-N generates the electronic signature by encrypting the transaction data generated by transaction data generator 1203-N with the secret key. Electronic signature unit 1204-N provides the generated electronic signature to transaction data generator 1203-N.

Transaction data generator 1203-N provides the transaction data to which the electronic signature was put to transaction data transmitter 1205-N.

Transaction data transmitter 1205-N provides a control signal for transmitting the transaction data to communication apparatus 140-N. The control signal includes an address of a node indicated in information on a destination of the transaction data. The transaction data is thus transmitted to a node of a concerned party through communication apparatus 140-N and network NW The node defined as the concerned party is a node in direct business relation, in other words, a node with a distributed ledger having a region superimposed on distributed ledger 14-N of a node itself.

<<Functional Block of Node: Function to Respond to Request for Addition of Subject Substance>>

Information obtaining unit 1201-N, transaction data generator 1203-N, electronic signature unit 1204-N, transaction data transmitter 1205-N, approver 1206-N, propagation unit 1207-N, and decision unit 1208-N perform a function to respond to a request for addition of a subject substance to restriction list 141-N.

Information obtaining unit 1201-N obtains transaction data transmitted from another node that forms distributed ledger network 2 through communication apparatus 140-N. This transaction data is transaction data (transaction data that requests for update of restriction list 141-N) that requests for addition of the subject substance to restriction list 141-N proposed by another node. Information obtaining unit 1201-N provides the obtained transaction data to approver 1206-N.

Approver 1206-N verifies the transaction data received from information obtaining unit 1201-N, and when approver 1206-N sees no problem in a result of verification of the transaction data, approver 1206-N approves the transaction data. In verification of the transaction data, transaction data directly or indirectly approved by the transaction data may retroactively be verified, and a fact that unauthorized transaction data has not been approved may be verified. Directly approved transaction data refers to transaction data in an input state. Indirectly approved transaction data refers to transaction data in the input state of directly approved transaction data or transaction data in the input state of any transaction data linked to directly approved transaction data. A verification technique may be, for example, a verification technique using an electronic signature put to transaction data (an electronic signature by another node) or another known verification technique.

Approver 1206-N provides approved transaction data to propagation unit 1207-N. In addition, approver 1206-N provides the approved transaction data to decision unit 1208-N.

Propagation unit 1207-N determines whether or not there is a node upstream from the node itself in the supply chain, and when there is an upstream node, propagation unit 1207-N provides information indicating a destination (an upstream node) of the transaction data to transaction data generator 1203-N, together with the approved transaction data.

Transaction data generator 1203-N changes information on the sender to the node itself and changes information on the destination of the transaction data to the upstream node in the transaction data received from propagation unit 1207-

N. Transaction data generator 1203-N obtains the electronic signature from electronic signature unit 1204-N. Then, transaction data generator 1203-N puts the electronic signature to the transaction data. Transaction data generator 1203-N provides the transaction data to which the electronic signature was put to transaction data transmitter 1205-N.

Transaction data transmitter 1205-N provides a control signal for transmitting the transaction data to communication apparatus 140-N. The transaction data that requests for addition of the subject substance to restriction list 141-N proposed by another node thus propagates to the upstream node. As node 12-N performs the function of propagation to the upstream node, of the transaction data that requests for addition of the subject substance to restriction list 141-N proposed by another node, the transaction data propagates to all nodes in distributed ledger network 2.

Decision unit 1208-N determines whether or not to accept (approve) processing contents shown in the transaction data approved by approver 1206-N. Specifically, decision unit 1208-N determines whether or not to add the new subject substance proposed by another node to restriction list 141-N. Initially, when information included in transaction data that shows whether or not a substance falls under the restricted substance indicates the "restricted substance," decision unit 1208-N confirms that the new subject substance falls under the restricted substance by referring to data on the restricted substance obtained from the outside (a server apparatus or the like in an external group). Alternatively, when information included in transaction data that shows whether or not a substance falls under the restricted substance indicates the "arbitrary chemical substance," decision unit 1208-N confirms that the new subject substance does not fall under the restricted substance (that is, the new subject substance falls under the arbitrary chemical substance) by referring to data on the restricted substance obtained from the outside. When decision unit 1208-N fails in confirmation as such, it determines to deny the request for addition of the subject substance.

When confirmation is successful, decision unit 1208-N determines whether or not the new subject substance addition of which to restriction list 141-N is requested is included in current restriction list 141-N (that is, it has already been approved). When the subject substance addition of which to restriction list 141-N is requested is already included in current restriction list 141-N, decision unit 1208-N determines to accept transaction data. When the subject substance addition of which to restriction list 141-N is requested is not included in current restriction list 141-N, decision unit 1208-N has display apparatus 180-N show information asking whether or not to accept (approve) transaction data and waits for an input from a user through input apparatus 170-N. When input information from the user indicates acceptance (approval of the request), decision unit 1208-N determines to accept the transaction data. When the input information from the user indicates rejection (denial of the request), decision unit 1208-N rejects acceptance of the transaction data.

When decision unit 1208-N determines to accept the transaction data, it designates a destination (a downstream node) of the transaction data to send the transaction data approved by approver 1206-N back to the downstream node which is the sender of the transaction data. Decision unit 1208-N provides information indicating the destination (downstream node) of the transaction data to transaction data generator 1203-N, together with the approved transaction data. When decision unit 1208-N rejects acceptance of the transaction data, it discards the transaction data approved by approver 1206-N.

Transaction data generator 1203-N changes information on the sender of the transaction data received from decision unit 1208-N to the node itself and changes information on the destination of the transaction data to the downstream node. Transaction data generator 1203-N obtains the electronic signature from electronic signature unit 1204-N. Then, transaction data generator 1203-N puts the electronic signature to the transaction data. Transaction data generator 1203-N provides the transaction data to which the electronic signature was put to transaction data transmitter 1205-N.

Transaction data transmitter 1205-N provides a control signal for transmitting the transaction data to communication apparatus 140-N. The transaction data is thus sent back to the downstream node. The transaction data sent back to the downstream node has the electronic signature by the downstream node and the electronic signature by node 12-N put thereto. This transaction data is held in the distributed ledgers of both of them (the distributed ledger of the downstream node and distributed ledger 14-N).

<<Functional Block of Node: Inquiry Function>>

Figure 11:
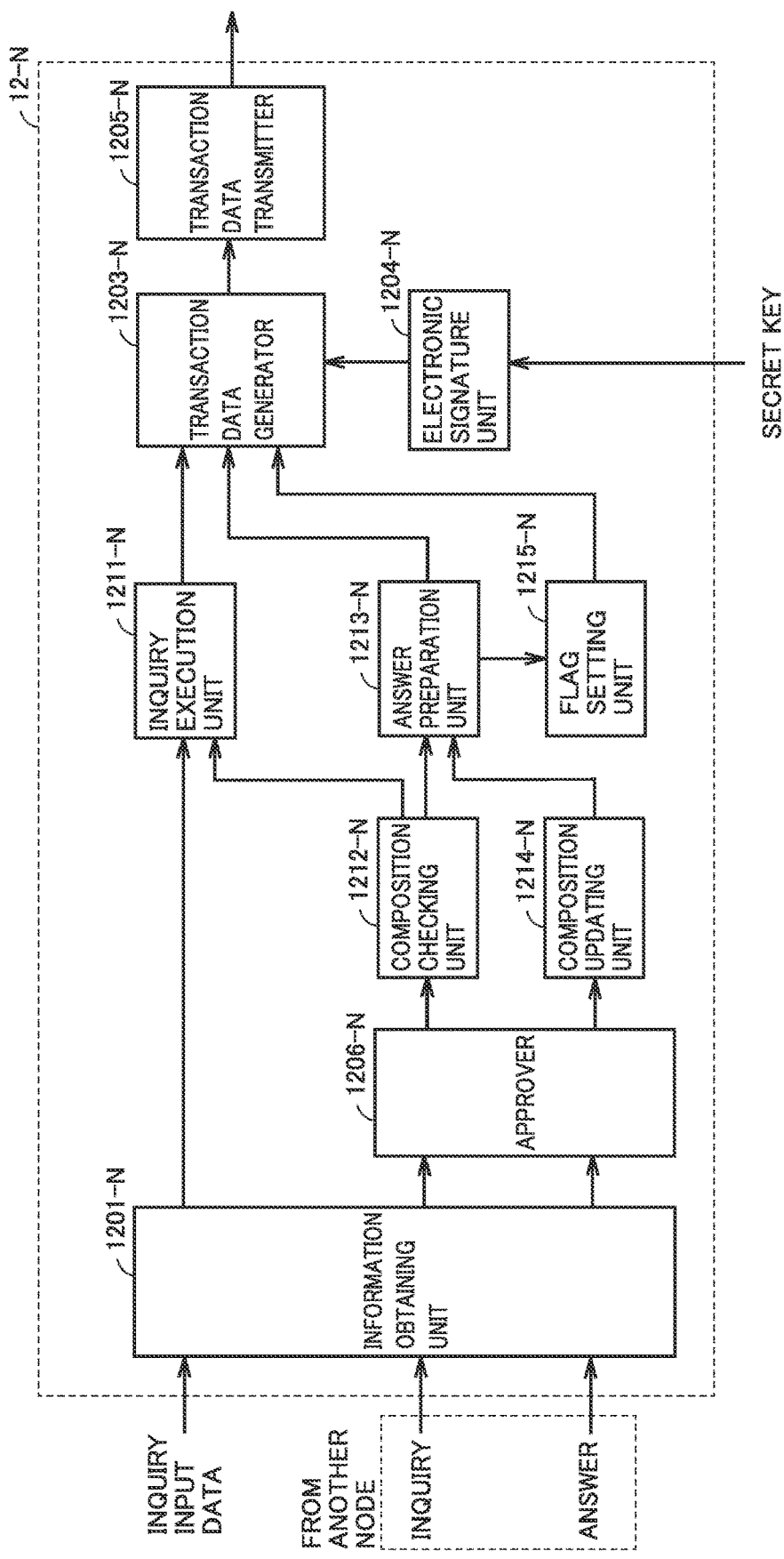
FIG. 11 is a functional block diagram of the controller (node) relating to an inquiry function and an answer function.

FIG. 11 is a functional block diagram of controller 110-N (node 12-N) relating to an inquiry function and an answer function. Referring to FIG. 11, node 12-N includes information obtaining unit 1201-N, transaction data generator 1203-N, electronic signature unit 1204-N, transaction data transmitter 1205-N, approver 1206-N, an inquiry execution unit 1211-N, a composition checking unit 1212-N, an answer preparation unit 1213-N, a composition updating unit 1214-N, and a flag setting unit 1215-N.

Information obtaining unit 1201-N, transaction data generator 1203-N, electronic signature unit 1204-N, transaction data transmitter 1205-N, and inquiry execution unit 1211-N perform a function to make an inquiry to another node (an upstream node).

Information obtaining unit 1201-N obtains inquiry input data entered through input apparatus 170-N. A user of information management apparatus 10-N can enter contents of an inquiry to an upstream company about the composition of a purchased product into input apparatus 170-N and have information obtaining unit 1201-N obtain the entered information as inquiry input data. The user of information management apparatus 10-N enters, for example, information on a source of an inquiry (the information management apparatus itself), information on a destination (an upstream company) of the inquiry, model number information of a product about which an inquiry is made, and information on an inquiry purpose, into an inquiry form shown on display apparatus 180-N. Such information is inquiry input data. As described above, the inquiry purpose may be selected, for example, from the "content" and "presence/absence". Information obtaining unit 1201-N provides the inquiry input data to inquiry execution unit 1211-N.

Inquiry execution unit 1211-N generates information to be conveyed to transaction data generator 1203-N based on the inquiry input data. Specifically, inquiry execution unit 1211-N extracts information on the sender (the information management apparatus itself) of transaction data, information on a destination (an upstream company from which the product about which the inquiry is made is purchased) of the transaction data, a type of a transaction (a request for disclosure of the composition), model number information of the product about which the inquiry is made, and an inquiry purpose based on the inquiry input data, and provides the extracted information to transaction data generator 1203-N.

Transaction data generator 1203-N generates transaction data from information received from inquiry execution unit 1211-N. The transaction data includes information on the sender (the information management apparatus itself) of the transaction data, information on the destination (the upstream company from which the product about which the inquiry is made is purchased) of the transaction data, a type of a transaction (a request for disclosure of the composition), model number information of the product about which the inquiry is made, and information on the inquiry purpose.

Transaction data generator 1203-N obtains the electronic signature from electronic signature unit 1204-N. Then, transaction data generator 1203-N puts the electronic signature to the transaction data. Transaction data generator 1203-N provides the transaction data to which the electronic signature was put to transaction data transmitter 1205-N.

Transaction data transmitter 1205-N provides a control signal for transmitting the transaction data to communication apparatus 140-N. An inquiry is thus sent to the upstream company from which the product about which the inquiry is made is purchased.

<<Functional Block of Node: Function to Respond to Received Inquiry>>

Information obtaining unit 1201-N, transaction data generator 1203-N, electronic signature unit 1204-N, transaction data transmitter 1205-N, approver 1206-N, inquiry execution unit 1211-N, composition checking unit 1212-N, answer preparation unit 1213-N, and flag setting unit 1215-N perform a function to respond to a received inquiry.

Information obtaining unit 1201-N obtains transaction data which is an inquiry transmitted from another node (a node of a downstream company) that forms distributed ledger network 2 through communication apparatus 140-N. Information obtaining unit 1201-N provides the obtained transaction data to approver 1206-N.

Approver 1206-N verifies the transaction data received from information obtaining unit 1201-N, and when approver 1206-N sees no problem in a result of verification of the transaction data, approver 1206-N approves the transaction data. Since details of approver 1206-N have been described above, description thereof will not be repeated. When approver 1206-N approves the transaction data, it provides information indicating approval to composition checking unit 1212-N, together with the transaction data.

Composition checking unit 1212-N checks the composition of a product about which the inquiry is made. Composition checking unit 1212-N checks the composition of the product about which the inquiry is made, for example, by referring to product composition data 151-N stored in storage 150-N. Specifically, composition checking unit 1212-N checks whether or not there is a product (a constituent product) included in the product about which the inquiry is made. When there is a product (a constituent product) included in the product about which the inquiry is made, composition checking unit 1212-N generates data corresponding to the inquiry input data described above and provides the data to inquiry execution unit 1211-N. When there is no product (constituent product) included in the product about which the inquiry is made, composition checking unit 1212-N provides transaction data to answer preparation unit 1213-N together with information indicating that a complete report can be issued.

Inquiry execution unit 1211-N generates information to be conveyed to transaction data generator 1203-N based on the data received from composition checking unit 1212-N. Specifically, inquiry execution unit 1211-N extracts information on a sender (a node itself) of the transaction data, information on a destination (an upstream company from which the constituent product is purchased) of the transaction data, a type of a transaction (a request for disclosure of the composition), model number information of the product about which the inquiry is made, and an inquiry purpose based on the data received from composition checking unit 1212-N, and provides the extracted information to transaction data generator 1203-N. With transaction data generator 1203-N, electronic signature unit 1204-N, and transaction data transmitter 1205-N, an inquiry is thus sent to the node of the upstream company from which the constituent product is purchased.

When answer preparation unit 1213-N receives information indicating that the complete report can be issued, it prepares answer data 143-N to the inquiry by referring to and using product composition data 151-N and restriction list 141-N. In other words, answer preparation unit 1213-N prepares answer data 143-N by picking up subject substances contained in the product about which the inquiry is made. Answer preparation unit 1213-N provides prepared answer data 143-N and information on the destination of answer data 143-N to transaction data generator 1203-N.

Transaction data generator 1203-N generates transaction data from information received from answer preparation unit 1213-N. The transaction data includes information on the sender (the node itself) of the transaction data, information on the destination (a downstream company to which the product about which the inquiry is made is supplied) of the transaction data, a type of a transaction (an answer), model number information of the product about which the inquiry is made, and answer data.

Transaction data generator 1203-N obtains the electronic signature from electronic signature unit 1204-N. Then, transaction data generator 1203-N puts the electronic signature to the transaction data. Transaction data generator 1203-N provides the transaction data to which the electronic signature was put to transaction data transmitter 1205-N.

Transaction data transmitter 1205-N provides a control signal for transmitting the transaction data to communication apparatus 140-N. An answer to the inquiry is thus transmitted to the downstream company that made the inquiry.

Answer preparation unit 1213-N provides information indicating that the complete report was issued to flag setting unit 1215-N.

When flag setting unit 1215-N receives information indicating that the complete report was issued, it sets the completion flag. Flag setting unit 1215-N provides information indicating that the complete report was finished (information indicating that the flag was set) and information on the destination of the transaction data to transaction data generator 1203-N.

Transaction data generator 1203-N generates transaction data from information received from flag setting unit 1215-N. The transaction data includes information on the sender (the node itself) of the transaction data, information on the destination (a downstream company to which the product about which the inquiry is made is supplied) of the transaction data, and information indicating that the complete report was finished.

Transaction data generator 1203-N obtains the electronic signature from electronic signature unit 1204-N. Then, transaction data generator 1203-N puts the electronic signature to the transaction data. Transaction data generator 1203-N provides the transaction data to which the electronic signature was put to transaction data transmitter 1205-N.

Transaction data transmitter 1205-N provides a control signal for transmitting the transaction data to communication apparatus 140-N. Information indicating that the complete report for the inquiry was finished is thus transmitted to the downstream company that made the inquiry.

<<Functional Block of Node: Function to Respond to Received Answer>>

Information obtaining unit 1201-N, transaction data generator 1203-N, electronic signature unit 1204-N, transaction data transmitter 1205-N, approver 1206-N, answer preparation unit 1213-N, composition updating unit 1214-N, and flag setting unit 1215-N perform a function to respond to a received answer.

Information obtaining unit 1201-N obtains transaction data that gives an answer transmitted from another node (a node of an upstream company) that forms distributed ledger network 2. Information obtaining unit 1201-N provides the obtained transaction data to approver 1206-N.

Approver 1206-N verifies the transaction data received from information obtaining unit 1201-N, and when approver 1206-N sees no problem in a result of verification of the transaction data, approver 1206-N approves the transaction data. When approver 1206-N approves the transaction data, it provides information indicating approval to composition updating unit 1214-N, together with the transaction data.

Composition updating unit 1214-N updates product composition data 151-N based on answer data included in the transaction data. Composition updating unit 1214-N provides information indicating update of product composition data 151-N to answer preparation unit 1213-N. Composition updating unit 1214-N determines whether or not a complete report can be issued to a downstream company in connection with a product of interest. In other words, composition updating unit 1214-N determines whether or not answers to the inquiry made by node 12-N to a node of an upstream company are all ready in connection with the product of interest. When the complete report can be issued to the downstream company in connection with the product of interest, composition updating unit 1214-N provides information indicating that the complete report can be issued to answer preparation unit 1213-N.

When answer preparation unit 1213-N receives information indicating update of product composition data 151-N, it prepares composition data (answer data 143-N) of the product of interest for reporting to the downstream company by referring to and using updated product composition data 151-N and restriction list 141-N. When answer preparation unit 1213-N has not received information indicating that the complete report can be issued at this time, it provides answer data 143-N as a partially completed report. When answer preparation unit 1213-N has received information indicating that the complete report can be issued, it provides answer data 143-N as the complete report. Answer preparation unit 1213-N provides prepared answer data 143-N and information on the destination of answer data 143-N to transaction data generator 1203-N. With transaction data generator 1203-N, electronic signature unit 1204-N, and transaction data transmitter 1205-N, composition data of the product of interest is thus given to the node of the downstream company to which the product of interest is supplied.

When answer preparation unit 1213-N issues the complete report, it provides information indicating that the complete report was issued to flag setting unit 1215-N. Since processing performed by flag setting unit 1215-N is as described above, description will not be repeated. Information indicating that the complete report was finished is thus sent to the downstream company.

<Sequence Diagram: Propagation of Request for Addition of Subject Substance>

Figure 12:
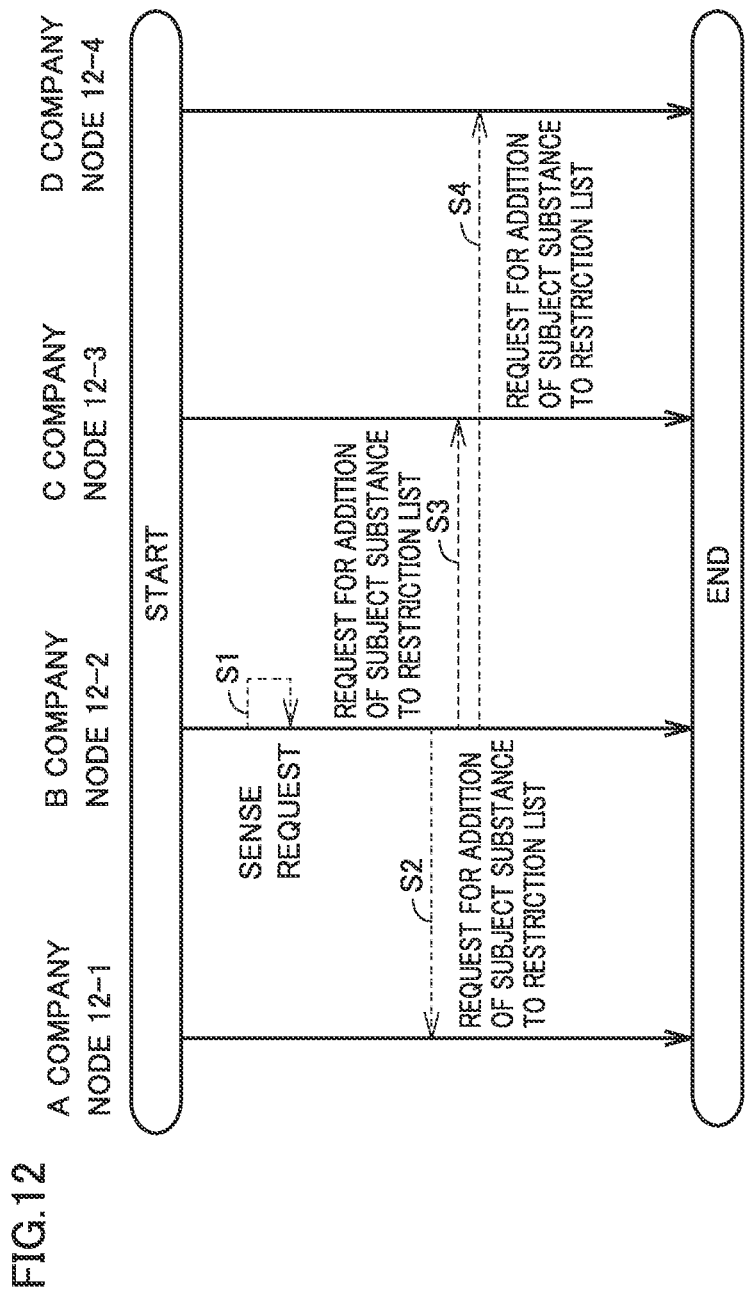
FIG. 12 is a sequence diagram (No. 1) showing a flow of propagation of a request for addition of a subject substance to the restriction list.

FIG. 12 is a sequence diagram showing a flow of propagation of a request for addition of a subject substance to restriction list 141-N. Processing shown in this sequence diagram is started when any of nodes 12-1 to 12-4 that form distributed ledger network 2 requests for update of restriction list 141-N. FIG. 12 shows an example in which node 12-2 of the B company first requests for addition of the subject substance to restriction list 141-N.

In S1, node 12-2 of the B company senses, for example, that the restricted substance has been added to the SVHC or that a user of information management apparatus 10-2 of the B company has performed processing for a request for addition of the subject substance.

In S2, node 12-2 of the B company requests node 12-1 of the A company to add the subject substance to restriction list 141-1.

In S3, node 12-2 of the B company requests node 12-3 of the C company to add the subject substance to restriction list 141-3.

In S4, node 12-2 of the B company requests node 12-4 of the D company to add the subject substance to restriction list 141-4.

Processing in S2 to S4 should only be performed in parallel.

As above, a request for addition of the subject substance to the restriction list from node 12-2 of the B company propagates between companies in direct business relation, and propagates to all other nodes that form distributed ledger network 2.

Figure 13:
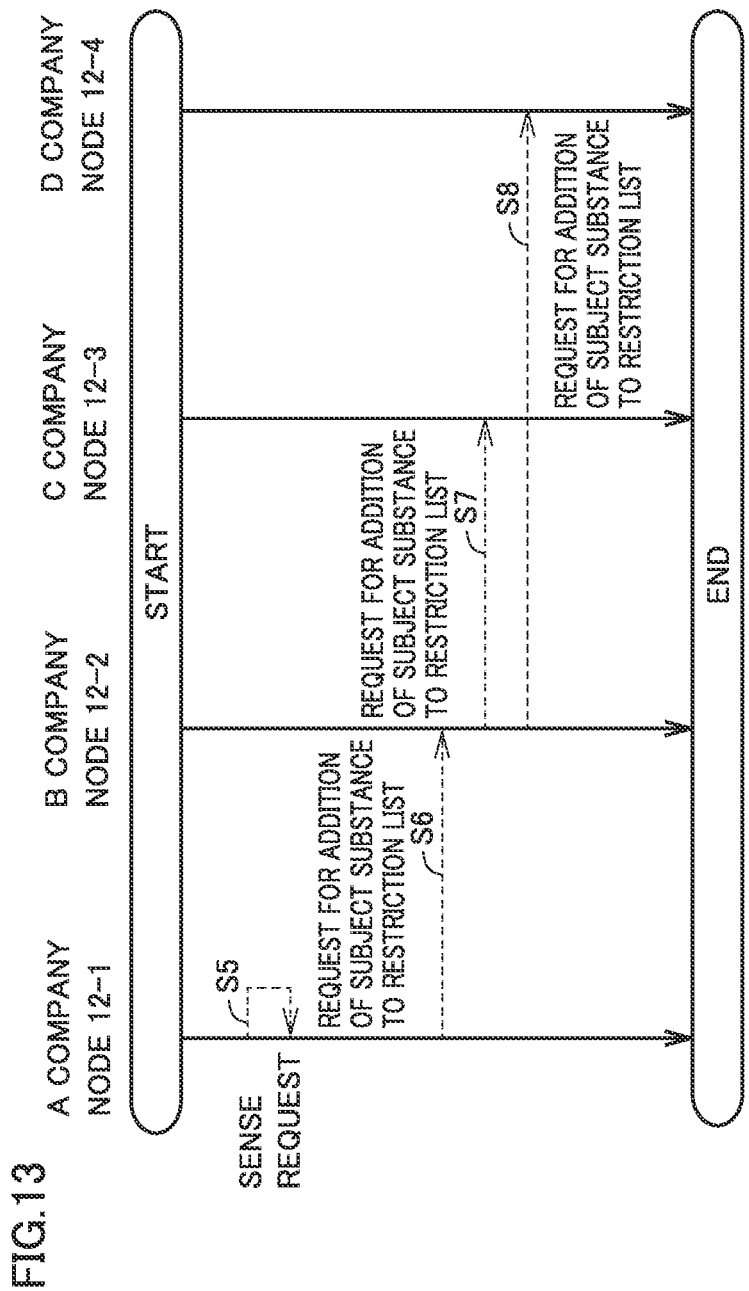
FIG. 13 is a sequence diagram (No. 2) showing a flow of propagation of a request for addition of a subject substance to the restriction list.

FIG. 13 is a sequence diagram showing a flow of propagation of a request for addition of a subject substance to restriction list 141-N. FIG. 13 shows an example in which node 12-1 of the A company first requests for addition of the subject substance to restriction list 141-N.

In S5, node 12-1 of the A company senses, for example, that the restricted substance has been added to the SVHC or that a user of information management apparatus 10-1 of the A company has performed processing for a request for addition of the subject substance.

In S6, node 12-1 of the A company requests node 12-2 of the B company to add the subject substance to restriction list 141-2.

In S7, node 12-2 of the B company has the request for addition of the subject substance to restriction list 141-3 propagate to node 12-3 of the C company.

In S8, node 12-2 of the B company has the request for addition of the subject substance to restriction list 141-4 propagate to node 12-4 of the D company.

Processing in S7 and S8 should only be performed in parallel.

As above, a request for addition of the subject substance to the restriction list from node 12-1 of the A company propagates between companies in direct business relation, and propagates to all other nodes that form distributed ledger network 2.

Figure 14:
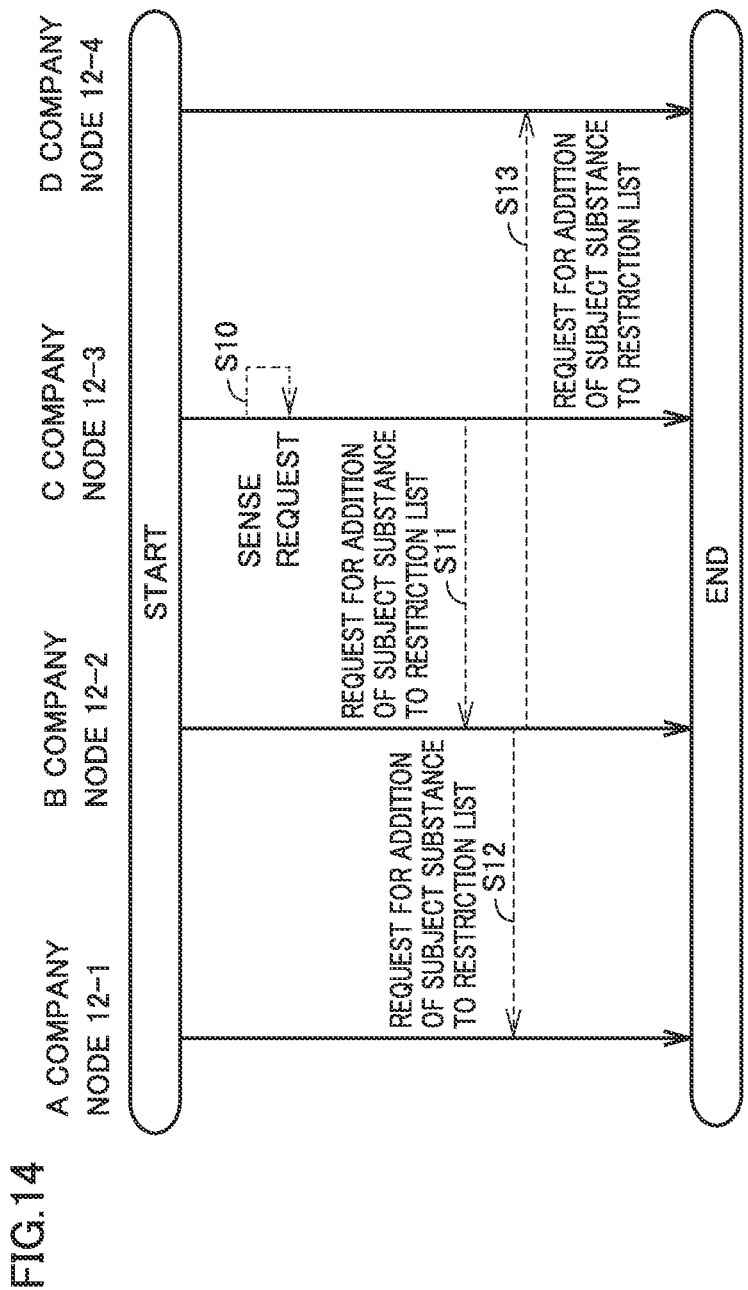
FIG. 14 is a sequence diagram (No. 3) showing a flow of propagation of a request for addition of a subject substance to the restriction list.

FIG. 14 is a sequence diagram showing a flow of propagation of a request for addition of a subject substance to restriction list 141-N. FIG. 14 shows an example in which node 12-3 of the C company requests for update of restriction lists 141-N of all nodes that form distributed ledger network 2.

In S10, node 12-3 of the C company senses, for example, that the restricted substance has been added to the SVHC or that a user of information management apparatus 10-3 of the C company has performed processing for a request for addition of the subject substance.

In S11, node 12-3 of the C company requests node 12-2 of the B company to add the subject substance to restriction list 141-2.

In S12, node 12-2 of the B company has the request for addition of the subject substance to restriction list 141-1 propagate to node 12-1 of the A company.

In S13, node 12-2 of the B company has the request for addition of the subject substance to restriction list 141-4 propagate to node 12-4 of the D company.

Processing in S12 and S13 should only be performed in parallel.

As above, a request for addition of the subject substance to the restriction list from node 12-3 of the C company propagates between companies in direct business relation, and propagates to all other nodes that form distributed ledger network 2.

<Flowchart: Approval and Denial of Request>

Figure 15:
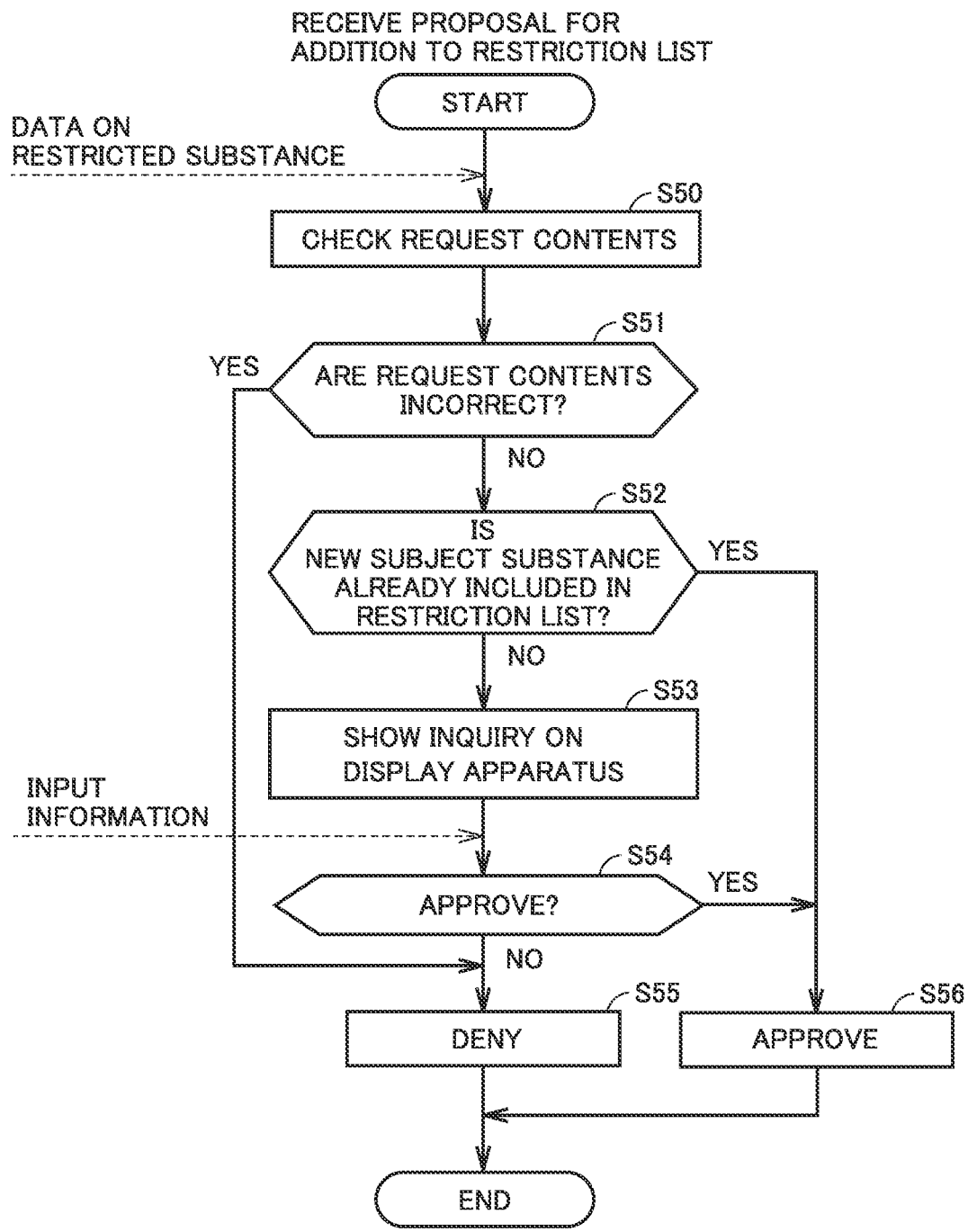
FIG. 15 is a flowchart showing a procedure of processing performed upon receiving from another node, a request for addition (request for update of the restriction list) of a new subject substance to the restriction list.

FIG. 15 is a flowchart showing a procedure of processing performed in node 12-N that receives a request for addition (a request for update of restriction list 141-N) of a new subject substance to restriction list 141-N from another node.

In S50, when node 12-N receives a request for addition of a new subject substance to restriction list 141-N from another node, it checks whether or not there is an error in contents of the request by referring to data on the restricted substance obtained from the outside (a server apparatus or the like in an external group). Specifically, node 12-N checks whether or not information included in transaction data indicating that a substance falls under a restricted substance has correctly been set.

In S51, node 12-N determines whether or not there is an error in the contents of the request in S50. When node 12-N determines that there is an error in the contents of the request (YES in S51), it has the process proceed to S55. When node 12-N determines that there is no error in the contents of the request (NO in S51), it has the process proceed to S52.

In S52, node 12-N determines whether or not the new subject substance is already included in restriction list 141-N. When the new subject substance is already included in restriction list 141-N (YES in S52), node 12-N has the process proceed to S56. When the new subject substance is not included in restriction list 141-N (NO in S52), node 12-N has the process proceed to S53.

In S53, node 12-N has display apparatus 180-N show information asking whether or not to accept the request (whether or not to approve the request) and waits for an input from a user onto input apparatus 170-N.

In S54, node 12-N determines whether or not input information from the user indicates approval of the request. When the input information from the user indicates rejection of acceptance (denial of the request), node 12-N has the process proceed to S55. When the input information from the user indicates acceptance (approval of the request), node 12-N has the process proceed to S56.

In S55, node 12-N determines to deny the request for addition of the new subject substance to restriction list 141-N.

In S56, node 12-N determines to approve the request for addition of the new subject substance to restriction list 141-N.

<Sequence Diagram: Inquiry and Answer>

Figure 16:
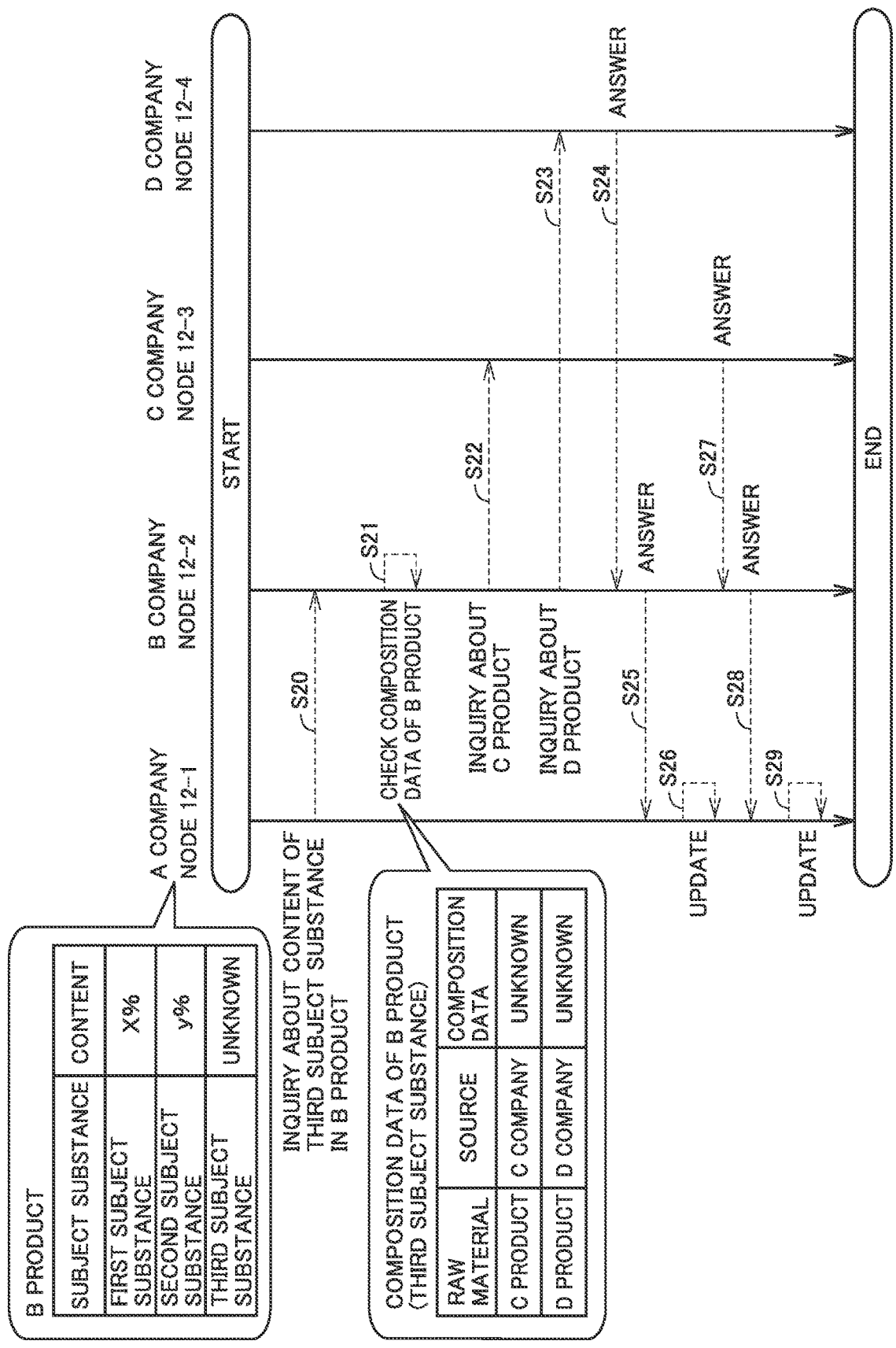
FIG. 16 is a sequence diagram showing a flow of an inquiry and an answer.

FIG. 16 is a sequence diagram showing a flow of an inquiry and an answer. Processing shown in this sequence diagram is started when any of nodes 12-1 to 12-4 that form distributed ledger network 2 makes an inquiry to an upstream company. FIG. 16 shows an example in which node 12-1 of the A company makes an inquiry to node 12-2 of the B company for the purpose of disclosure of the content of a specific subject substance (third subject substance) in the B product. Node 12-1 of the A company can make an inquiry to node 12-2 of the B company in direct business relation at arbitrary timing. A scene in which node 12-1 of the A company has already obtained composition data of the first subject substance and the second subject substance in the B product, whereas it has not obtained composition data of the third subject substance is assumed. In addition, a scene in which the B company has not yet obtained composition data of the third subject substance in the C product and the D product included in the B product is assumed.

In S20, node 12-1 of the A company transmits inquiry data 142-1 that requests for disclosure of the composition data of the B product to node 12-2 of the B company. The inquiry in S20 may be an inquiry about the content of the third subject substance in the B product.

In S21, node 12-2 of the B company reads product composition data 151-1 from storage 150-2 and checks the composition data of the B product. Node 12-2 of the B company thus recognizes that it has not yet obtained composition data of the third subject substance in the C product and the D product.

In S22, node 12-2 of the B company transmits inquiry data 142-2 that requests for disclosure of the composition data of the C product to node 12-3 of the C company. The inquiry in S22 may be an inquiry about the content of the third subject substance in the C product.

In S23, node 12-2 of the B company transmits inquiry data 142-2 that requests for disclosure of the composition data of the D product to node 12-4 of the D company. The inquiry in S23 may be an inquiry about the content of the third subject substance in the D product.

Node 12-2 of the B company performs processing in S22 and S23 in parallel.

In S24, node 12-4 of the D company generates composition data (answer data 143-4) of the D product based on product composition data 151-4. Node 12-4 of the D company gives the composition data of the D product as the answer to node 12-2 of the B company. Node 12-4 of the D company may give the content of the third subject substance in the D product as the answer to node 12-2 of the B company.

In S25, node 12-2 of the B company updates product composition data 151-2 of the B product of the node itself based on answer data 143-4 from node 12-4 of the D company, and generates composition data (answer data 143-2) of the B product based on updated product composition data 151-2. Node 12-2 of the B company gives answer data 143-2 as the partially completed report to node 12-1 of the A company.

In S26, node 12-1 of the A company updates product composition data 151-1 of the B product of the node itself based on answer data 143-2 from node 12-2 of the B company.

In S27, node 12-3 of the C company generates composition data (answer data 143-3) of the C product based on product composition data 151-3. Node 12-3 of the C company gives the composition data of the C product as the answer to node 12-2 of the B company. Node 12-3 of the C company may give the content of the third subject substance in the C product as the answer to node 12-2 of the B company.

In S28, node 12-2 of the B company updates product composition data 151-2 of the B product of the node itself based on answer data 143-3 from node 12-3 of the C company. Pieces of composition data on the third subject substance in the B product are thus all ready. Node 12-2 of the B company generates composition data (answer data 143-2) of the B product based on updated product composition data 151-2 of the B product. Node 12-2 of the B company gives answer data 143-2 as the complete report to node 12-1 of the A company. When node 12-2 of the B company issues the complete report, it sets the completion flag.

In S29, node 12-1 of the A company updates product composition data 151-1 of the B product of the node itself based on the answer from node 12-2 of the B company.

As above, the report from node 12-2 of the B company to node 12-1 of the A company (the partially completed report and the complete report) does not include information (for example, a name or the like) on the C company and the D company. The B company can thus appropriately give necessary information (composition data of the B product) to the A company while it conceals the upstream company in the supply chain of the B product.

<Sequence Diagram: Registration of New Product>

Figure 17:
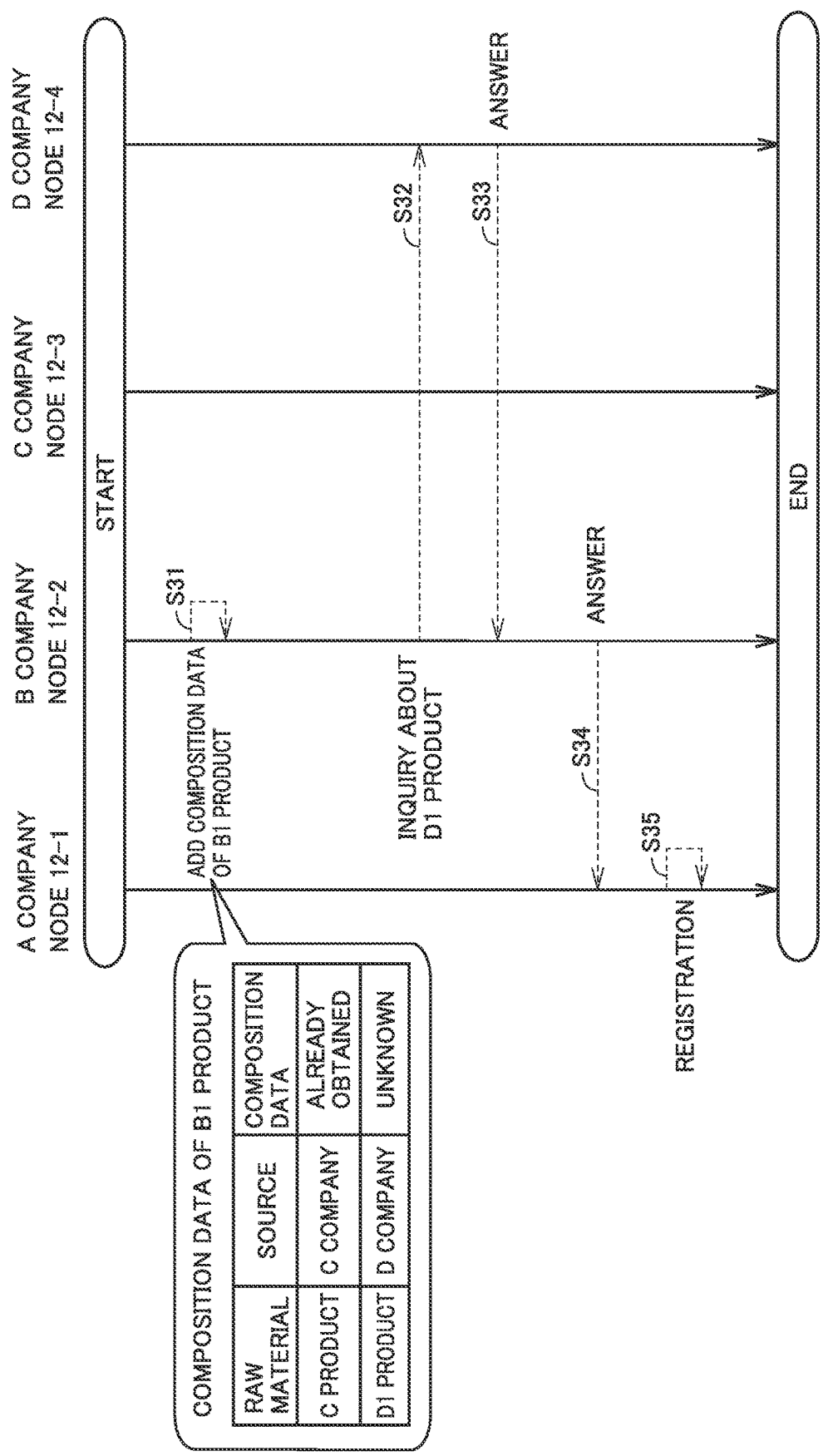
FIG. 17 is a sequence diagram (No. 1) showing a flow of registration of a new product.

FIG. 17 is a sequence diagram showing a flow of registration of a new product.

Processing shown in this sequence diagram is started when any of nodes 12-1 to 12-4 that form distributed ledger network 2 adds composition data of the new product to product composition data 151-N of the node itself. In FIG. 17, a scene in which composition data of the B1 product which is the new product of the B company is added to product composition data 151-2 in information management apparatus 10-2 of the B company is assumed. The B1 product includes the C product and the D1 product. It is assumed that node 12-2 of the B company has already obtained composition data of the C product, whereas it has not yet obtained composition data of the D1 product.

In S31, node 12-2 of the B company senses addition of composition data of the B1 product to product composition data 151-2 stored in storage 150-2 of information management apparatus 10-2. Node 12-2 of the B company recognizes that it has already obtained composition data of the C product included in the B1 product, whereas it has not yet obtained composition data of the D1 product, by referring to product composition data 151-2.

In S32, node 12-2 of the B company prepares inquiry data 142-2 that makes an inquiry about composition data of the D1 product and transmits inquiry data 142-2 to node 12-4 of the D company.

In S33, node 12-4 of the D company generates composition data (answer data 143-4) of the D1 product and transmits answer data 143-4 to node 12-2 of the B company.

In S34, node 12-2 of the B company updates composition data of the B1 product based on answer data 143-4 from node 12-4 of the D company and updates product composition data 151-2. Pieces of composition data of the B1 product are thus all ready. Node 12-2 of the B company generates composition data (answer data 143-2) of the B1 product based on updated product composition data 151-2 of the B1 product. Node 12-2 of the B company transmits answer data 143-2 to node 12-1 of the A company.

In S35, node 12-1 of the A company adds the composition data of the B1 product to product composition data 151-1 based on answer data 143-2 from node 12-2 of the B company and updates product composition data 151-1.

Figure 18:
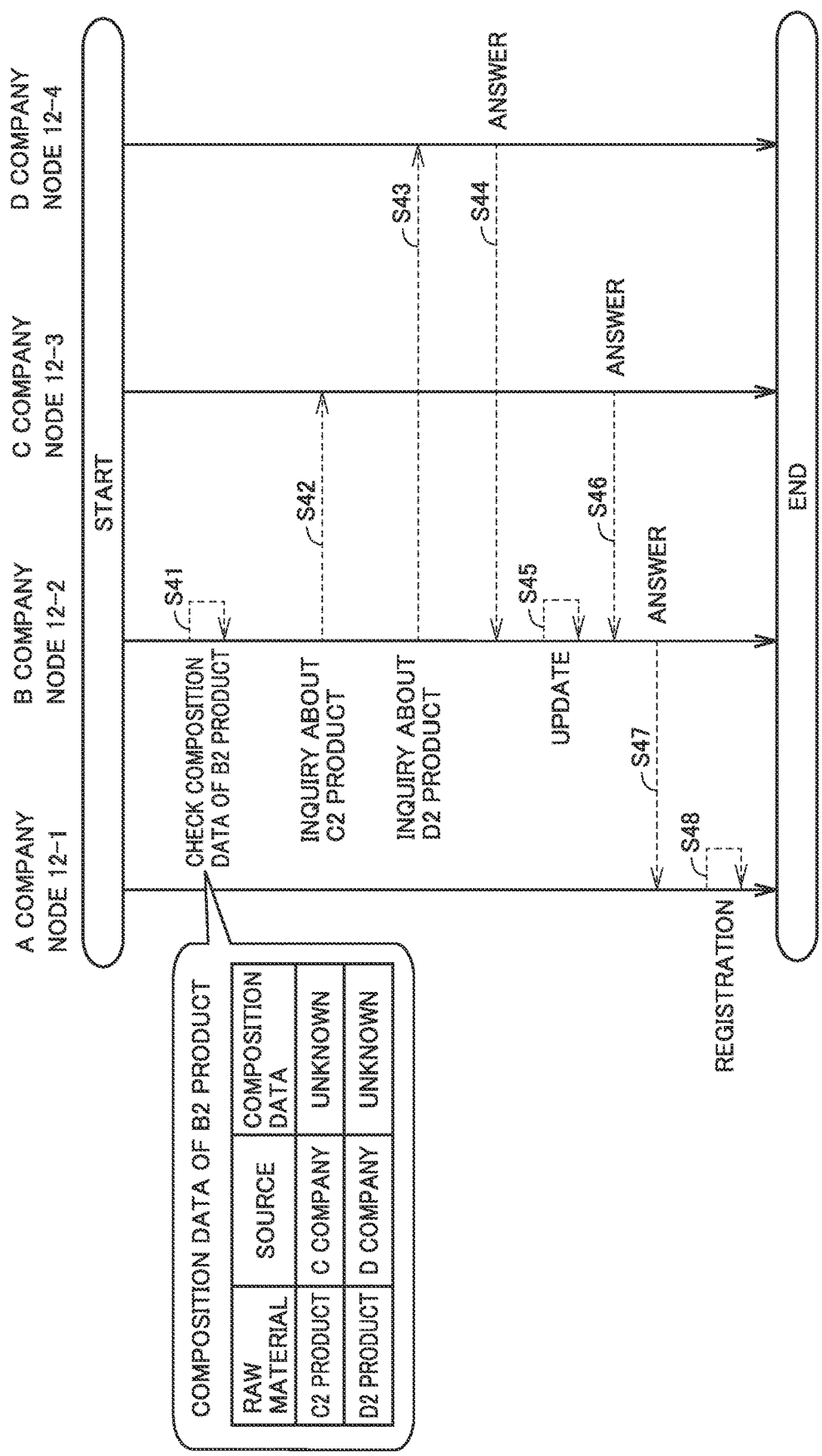
FIG. 18 is a sequence diagram (No. 2) showing a flow of registration of a new product.

FIG. 18 is a sequence diagram showing a flow of registration of a new product. In FIG. 18, a scene in which composition data of a B2 product which is a new product of the B company is added to product composition data 151-2 in information management apparatus 10-2 of the B company is assumed. The B2 product includes a C2 product and a D2 product. A difference from FIG. 17 resides in that node 12-2 of the B company has obtained neither of composition data of the C2 product and composition data of the D2 product.

In S41, node 12-2 of the B company senses addition of composition data of the B2 product to product composition data 151-2 stored in storage 150-2 of information management apparatus 10-2. Node 12-2 of the B company recognizes that it has not yet obtained composition data of the C2 product and the D2 product included in the B2 product, by referring to product composition data 151-2.

In S42, node 12-2 of the B company prepares inquiry data 142-2 that makes an inquiry about composition data of the C2 product and transmits inquiry data 142-2 to node 12-3 of the C company.

In S43, node 12-2 of the B company prepares inquiry data 142-2 that makes an inquiry about composition data of the D2 product and transmits inquiry data 142-2 to node 12-4 of the D company.

Node 12-2 of the B company performs processing in S42 and S43 in parallel.

In S44, node 12-4 of the D company generates composition data (answer data 143-4) of the D2 product and transmits answer data 143-4 to node 12-2 of the B company.

In S45, node 12-2 of the B company updates composition data of the B2 product based on answer data 143-4 from node 12-4 of the D company and updates product composition data 151-2. At this time point, answers to the inquiry have not been all ready, and hence node 12-2 of the B company waits until all answers are ready.

In S46, node 12-3 of the C company generates composition data (answer data 143-3) of the C2 product and transmits answer data 143-3 to node 12-2 of the B company.

In S47, node 12-2 of the B company updates composition data of the B2 product based on answer data 143-3 from node 12-3 of the C company and updates product composition data 151-2. At this time point, all answers are ready and pieces of composition data of the B2 product are all ready. Node 12-2 of the B company generates composition data (answer data 143-2) of the B2 product based on updated product composition data 151-2 of the B2 product. Node 12-2 of the B company transmits answer data 143-2 to node 12-1 of the A company.

In S48, node 12-1 of the A company adds composition data of the B2 product to product composition data 151-1 based on the answer from node 12-2 of the B company and updates product composition data 151-1.

As above, the report from node 12-2 of the B company to node 12-1 of the A company does not include information (for example, a name or the like) on the C company and the D company. The B company can thus appropriately give necessary information to the A company while it conceals the upstream company in the supply chain of the B2 product.

As set forth above, in information management system 1 according to the present embodiment, a chemical substance in the supply chain is managed while information is shared among information management apparatuses (nodes that form the distributed ledger network) of concerned parties in direct business relation. For example, a midstream company may not want a downstream company to which the midstream company supplies a certain product to know an upstream company from which the midstream company receives supply of a product included in the certain product. As direct sharing of information is limited to sharing among nodes of concerned parties, for example, disclosure of information such as a name of an upstream company to a downstream company can be suppressed.

By managing information on a chemical substance contained in a product based on the distributed ledger technology, information is quickly conveyed among nodes of companies. Therefore, information on the chemical substance contained in the product distributed in the supply chain can more quickly be conveyed, for example, than in management by using such means for communication as an electronic mail, telephone, or facsimile.

In information management system 1 according to the present embodiment, by forming the distributed ledger network, tamper resistance of information can be improved.

In information management system 1 according to the present embodiment, when a new subject substance is added to the restriction list, the B company which is the midstream company requests the C company and the D company which are the upstream companies to disclose information on the new subject substance contained in the purchased product (the C product and the D product). When the B company obtains an answer from at least one of the upstream companies (the C company or the D company), it prepares composition data of the B product supplied to the A company and gives the composition data to the A company as the partially completed report. Even if a report about the B product is not the complete report, the A company may desire to successively receive reports about the new subject substance when some reports are ready. Information management system 1 according to the present embodiment can successively give the A company information on the new subject substance contained in the B product by providing the partially completed report.

When the B company provides the complete report including the information on the new subject substance to the A company, it sets the completion flag indicating completion of the report. The A company can thus recognize that it has received all reports about the new subject substance.

In information management system 1 according to the present embodiment, node 12-N can deny the request (proposal) for addition of the new subject substance to restriction list 141-N received from another node. A proposal for update of restriction list 141-N made by a certain node may be incorrect. As node 12-N performs a function to deny the proposal for update of restriction list 141-N from another node, it can double-check contents of a proposal as information management system 1 so to speak. With the ability to deny an incorrect proposal, disclosure of information more than necessary can be suppressed.

First Modification

An example in which information management system 1 according to the embodiment manages information on a chemical substance contained in a product distributed in the supply chain based on the distributed ledger technology is described. Then, it is described that CORDA may be adopted as the distributed ledger platform. For example, instead of CORDA, another known distributed ledger platform can also be adopted. For example, a blockchain platform may be adopted.

Information on the chemical substance contained in the product distributed in the supply chain may be managed without using the distributed ledger technology. In this case, for example, information may be conveyed over network NW between companies in direct business relation. Means for communication among the companies may be, for example, a mail or specifically constructed communication means.

Second Modification

A rank indicating an allowable disclosure level may be set for information included in product composition data 151-N. For example, first and second allowable disclosure levels are set. The first allowable disclosure level refers to a level at which disclosure can be made when a substance is designated as the restricted substance (that is, for conforming to laws and regulations). The second allowable disclosure level refers to a level at which disclosure can be made when a substance is registered in restriction list 141-N.

Information indicating whether or not a substance falls under the restricted substance is set in restriction list 141-N, in association with the subject substance.

For example, it is assumed that a certain product contains a first subject substance and a second subject substance. It is assumed that the first allowable disclosure level is set for the first subject substance and the second subject substance. Then, it is assumed that the first subject substance falls under the restricted substance and the second subject substance does not fall under the restricted substance.

When node 12-N receives a request for disclosure of composition data of a certain product, it refers to restriction list 141-N. Then, node 12-N discloses composition data of the first subject substance, whereas it does not disclose composition data of the second subject substance.

Thus, conformity with the laws and regulations can appropriately be achieved while excessive disclosure of composition data of a product which is a trade secret can be suppressed.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. An information management system that manages information on a chemical substance contained in a product distributed in a supply chain with a distributed ledger technology, the information management system comprising:
   a plurality of apparatuses belonging to a plurality of companies included in the supply chain, respectively; and
   a network over which the plurality of apparatuses are connected to one another, wherein
   each of the plurality of apparatuses includes:
      a storage in which a distributed ledger is stored, the distributed ledger including a list that shows a chemical substance managed in the information management system, and
      an input device that accepts input information from a user, the input information including first information and second information, the first information showing a new chemical substance proposed to be managed in the information management system, the second information showing whether the new chemical substance falls under a restricted substance that refers to a chemical substance designated under laws and regulations, each of the plurality of apparatuses discloses to an apparatus of a downstream company in the supply chain, information on a chemical substance contained in a product supplied to the downstream company and included in the list, the apparatus being included in the plurality of apparatuses, and each of the plurality of apparatuses is configured to together perform a process including:

transmitting, from a transmitting apparatus of the plurality of apparatuses to one or more different apparatuses of the plurality of apparatuses, first transaction data, when the input device of the transmitting apparatus has accepted the input information, the first transaction data including the second information of the input information, and indicating a request for addition of the new chemical substance to the list;

when the one or more of the plurality of apparatuses receive the first transaction data from the transmitting apparatus, each of the one or more different apparatuses verifies the first transaction data based on third information obtained from an external apparatus that manages information on the laws and regulations and publishes the restricted substance on the Internet, verifying the first transaction data including checking correctness of the second information included in the first transaction data, in accordance with the third information; and transmitting, by one of the one or more different apparatuses when the second information is determined to be incorrect by the one of the one or more different apparatuses as a result of the checking, second transaction data denying the request for addition received from the transmitting apparatus to the each of the plurality of apparatuses, each of the plurality of apparatuses further includes a display, and the transmitting apparatus:

has information indicating denial of the request for addition shown on the display of the transmitting apparatus when the transmitting apparatus receives the second transaction data from the one or more different apparatuses, and transmits the first transaction data again to the one or more different apparatuses when the input information accepted by the input device of the transmitting apparatus is corrected after the display of the transmitting apparatus shows the information indicating the denial.

2. The information management system according to claim 1, wherein the plurality of apparatuses include
a first apparatus of a first company that manufactures a first product,
a second apparatus of a second company that supplies to the first company, a second product included in the first product, and
a third apparatus of a third company that supplies to the second company, a third product included in the second product, the first apparatus, the second apparatus, and the third apparatus include a first distributed ledger, a second distributed ledger, and a third distributed ledger, respectively, the first distributed ledger and the second distributed ledger share transaction data including information on a chemical substance contained in the second product, the second distributed ledger and the third distributed ledger share transaction data including information on a chemical substance contained in the third product, and the first distributed ledger and the third distributed ledger do not share transaction data.

* * * * *